United States Patent
Yamaguchi

(12) 
(10) Patent No.: US 11,794,524 B2
(45) Date of Patent: Oct. 24, 2023

(54) PNEUMATIC TIRE

(71) Applicant: The Yokohama Rubber Co., LTD., Tokyo (JP)

(72) Inventor: Yukihito Yamaguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 386 days.

(21) Appl. No.: 17/031,658

(22) Filed: Sep. 24, 2020

(65) Prior Publication Data
US 2021/0008927 A1 Jan. 14, 2021

Related U.S. Application Data

(62) Division of application No. 14/434,748, filed as application No. PCT/JP2012/076245 on Oct. 10, 2012, now Pat. No. 10,821,779.

(51) Int. Cl.
*B60C 3/04* (2006.01)
*B60C 9/18* (2006.01)
(Continued)

(52) U.S. Cl.
CPC .............. *B60C 9/18* (2013.01); *B60C 5/12* (2013.01); *B60C 9/0007* (2013.01); *B60C 9/185* (2013.01);
(Continued)

(58) Field of Classification Search
CPC ......... B60C 9/185; B60C 9/22; B60C 9/2006; B60C 3/04; B60C 2009/2252;
(Continued)

(56) References Cited

U.S. PATENT DOCUMENTS 3,939,890 A    2/1976  Abe
5,738,740 A *  4/1998  Cluzel .................. B60C 9/1821
                                                           152/526
(Continued)

FOREIGN PATENT DOCUMENTS

DE    10 2008 055 498    6/2010
JP    S62-015104          1/1987
(Continued)

OTHER PUBLICATIONS

International Search Report for International Application No. PCT/JP2012/076245 dated Jan. 15, 2013, 4 pages, Japan.

*Primary Examiner* — Steven D Maki
(74) *Attorney, Agent, or Firm* — Thorpe North & Western, LLP; Randy M. Braegger

(57) ABSTRACT

A pneumatic tire comprises a carcass layer, a belt layer disposed on the outer side in the tire radial direction of the carcass layer, and tread rubber disposed on the outer side in the tire radial direction of the belt layer. The belt layer is formed by laminating a pair of cross belts having belt angles with an absolute value from 10° to 45° both inclusive and mutually opposite signs, and a circumferential reinforcing layer having a belt angle within a range of ±5° relative to the tire circumferential direction. The distance (Gcc) from the tread profile to the tire inner circumferential surface along the tire equatorial plane and the distance (Gsh) from the tread edge to the tire inner circumferential surface have a relationship satisfying 1.10≤Gsh/Gcc. The groove depth (Dsh) and under-groove gauge (UDsh) of the outermost circumferential main groove have a relationship satisfying 0.20≤UDsh/Dsh.

14 Claims, 10 Drawing Sheets

(51) Int. Cl.
*B60C 9/20* (2006.01)
*B60C 9/22* (2006.01)
*B60C 11/00* (2006.01)
*B60C 11/01* (2006.01)
*B60C 9/28* (2006.01)
*B60C 11/13* (2006.01)
*B60C 5/12* (2006.01)
*B60C 9/00* (2006.01)
*B60C 11/03* (2006.01)
*B60C 11/04* (2006.01)
*B60C 11/02* (2006.01)

(52) U.S. Cl.
CPC ............ *B60C 9/2006* (2013.01); *B60C 9/22* (2013.01); *B60C 9/28* (2013.01); *B60C 11/01* (2013.01); *B60C 11/0311* (2013.01); *B60C 11/1369* (2013.01); *B60C 3/04* (2013.01); *B60C 11/02* (2013.01); *B60C 11/04* (2013.01); *B60C 2009/209* (2013.01); *B60C 2009/2064* (2013.01); *B60C 2009/2083* (2013.01); *B60C 2009/2252* (2013.01); *B60C 2009/2266* (2013.01); *B60C 2011/0033* (2013.01); *B60C 2011/0355* (2013.01); *B60C 2011/0379* (2013.01); *B60C 2200/06* (2013.01)

(58) Field of Classification Search
CPC ..... B60C 2009/2266; B60C 2011/0355; B60C 2011/0033
See application file for complete search history.

(56) References Cited

U.S. PATENT DOCUMENTS

| | | | |
|---|---|---|---|
| 6,401,778 B1 | 6/2002 | Cluzel | |
| 10,821,779 B2* | 11/2020 | Yamaguchi | B60C 9/28 |
| 2005/0000613 A1* | 1/2005 | Maruoka | B60C 11/04 |
| | | | 152/209.1 |
| 2005/0230020 A1* | 10/2005 | Miyake | B60C 11/042 |
| | | | 152/209.19 |
| 2006/0137790 A1* | 6/2006 | de Barsy | B60C 11/04 |
| | | | 152/209.16 |
| 2006/0169380 A1 | 8/2006 | Radulescu et al. | |
| 2006/0169381 A1* | 8/2006 | Radulsescu | B60C 9/28 |
| | | | 152/531 |
| 2006/0169383 A1 | 8/2006 | Radulescu et al. | |
| 2007/0151643 A1* | 7/2007 | Takahashi | B60C 11/0306 |
| | | | 152/902 |
| 2009/0277557 A1* | 11/2009 | Suzuki | B60C 9/2006 |
| | | | 152/532 |
| 2012/0097307 A1* | 4/2012 | Delebecq | B60C 9/0007 |
| | | | 152/527 |
| 2012/0241061 A1* | 9/2012 | Maehara | B60C 11/0306 |
| | | | 152/209.22 |
| 2014/0305566 A1* | 10/2014 | Mashiyama | B60C 9/20 |
| | | | 152/454 |
| 2014/0326375 A1* | 11/2014 | Okabe | B60C 9/0007 |
| | | | 152/154.2 |
| 2014/0326380 A1 | 11/2014 | Kotoku | |
| 2015/0151581 A1* | 6/2015 | Kunugi | B60C 11/1392 |
| | | | 152/209.18 |

FOREIGN PATENT DOCUMENTS

| | | |
|---|---|---|
| JP | H01-145206 | 6/1989 |
| JP | H04-066304 | 3/1992 |
| JP | H09-226323 | 9/1997 |
| JP | 2001-522748 | 11/2001 |
| JP | 2006-528103 | 12/2006 |
| JP | 2008-001264 | 1/2008 |
| JP | 4642760 | 3/2011 |
| JP | 4663638 | 4/2011 |
| JP | 4663639 | 4/2011 |
| JP | 4918948 | 4/2012 |
| JP | 4984013 | 7/2012 |
| JP | 5029787 | 9/2012 |
| JP | 5029787 B1 * | 9/2012 |
| WO | WO 99-024269 | 5/1999 |
| WO | WO 2005/016666 | 2/2005 |
| WO | WO 2005/016667 | 2/2005 |
| WO | WO 2005/016668 | 2/2005 |
| WO | WO 2007/148447 | 12/2007 |
| WO | WO 2013/042254 | 3/2013 |
| WO | WO 2013/042256 | 3/2013 |
| WO | WO 2014/010351 | 1/2014 |

* cited by examiner

COMPARATIVE EXAMPLE
(Gsh/Gcc=1.06)

WORKING EXAMPLES
(Gsh/Gcc=1.20)

FIG. 15

| | Conventional Example | COMPARATIVE EXAMPLE | Working Example 1 | Working Example 2 | Working Example 3 | Working Example 4 | Working Example 5 | Working Example 6 | Working Example 7 | Working Example 8 | Working Example 9 | Working Example 10 |
|---|---|---|---|---|---|---|---|---|---|---|---|---|
| Circumferential reinforcing layer | None | Yes | Yes | Yes | Yes | Yes | Yes | Yes | Yes | Yes | Yes | Yes |
| Gsh/Gcc | 1.06 | 1.06 | 1.10 | 1.20 | 1.25 | 1.25 | 1.25 | 1.25 | 1.25 | 1.25 | 1.25 | 1.25 |
| UDsh/Dsh | 0.17 | 0.17 | 0.20 | 0.20 | 0.20 | 0.30 | 0.30 | 0.30 | 0.20 | 0.30 | 0.30 | 0.30 |
| UDcc/Dcc | 0.17 | 0.17 | 0.17 | 0.17 | 0.17 | 0.17 | 0.20 | 0.30 | 0.20 | 0.30 | 0.30 | 0.30 |
| Drg/(Dsh + UDsh) | 0.65 | 0.65 | 0.65 | 0.65 | 0.65 | 0.65 | 0.65 | 0.65 | 0.70 | 0.70 | 0.90 | 1.10 |
| Ws/TW | - | 0.65 | 0.65 | 0.65 | 0.65 | 0.65 | 0.65 | 0.65 | 0.65 | 0.65 | 0.65 | 0.65 |
| Belt edge separation resistance performance | 100 | 103 | 105 | 107 | 108 | 108 | 108 | 108 | 108 | 108 | 108 | 108 |
| Yield of the base tire (%) | 70 | 72 | 78 | 80 | 82 | 84 | 86 | 87 | 95 | 98 | 100 | 98 |

| | Working Example 11 | Working Example 12 | Working Example 13 | Working Example 14 | Working Example 15 | Working Example 16 | Working Example 17 | Working Example 18 |
|---|---|---|---|---|---|---|---|---|
| Circumferential reinforcing layer | Yes | Yes | Yes | Yes | Yes | Yes | Yes | Yes |
| Gsh/Gcc | 1.25 | 1.10 | 1.20 | 1.25 | 1.25 | 1.25 | 1.25 | 1.10 |
| UDsh/Dsh | 0.30 | 0.30 | 0.30 | 0.30 | 0.30 | 0.30 | 0.30 | 0.30 |
| UDcc/Dcc | 0.30 | 0.30 | 0.30 | 0.30 | 0.30 | 0.30 | 0.30 | 0.30 |
| Drg/(Dsh + UDsh) | 1.20 | 0.90 | 0.90 | 0.90 | 0.90 | 0.90 | 0.90 | 0.90 |
| Ws/TW | 0.65 | 0.70 | 0.70 | 0.70 | 0.80 | 0.90 | 0.95 | 0.95 |
| Belt edge separation resistance performance | 108 | 109 | 112 | 115 | 117 | 115 | 108 | 105 |
| Yield of the base tire (%) | 93 | 100 | 100 | 100 | 100 | 100 | 100 | 100 |

FIG. 16

PNEUMATIC TIRE

RELATED APPLICATIONS

This application is a divisional of U.S. patent application Ser. No. 14/434,748, filed on Apr. 9, 2015, which is the National Stage of International Patent Application No. PCT/JP2012/076245, filed on Oct. 10, 2012.

TECHNICAL FIELD

The present technology relates to a pneumatic tire, more specifically a pneumatic tire that can improve the yield of the base tire used in a retread tire.

BACKGROUND

Recent heavy duty tires mounted on trucks, buses, and the like maintain the shape of tread portions by disposing a circumferential reinforcing layer in the belt layer, while having a low aspect ratio. The circumferential reinforcing layer is a belt ply having a belt angle that is substantially 0° relative to the tire circumferential direction, and is disposed so as to be laminated upon a pair of cross belts. The technology disclosed in Japanese Patent Nos. 4642760, 4663638 and 4663639 relates to conventional pneumatic tires that are configured in this manner.

In recent years, there has been a focus on retread tires due to cost and environmental concerns. Retread tires are reused tires wherein tread rubber that has reached the end of its useful life is replaced, and are manufactured by two methods: precuring and remolding. Precured retread tires are manufactured by removing the tread rubber of a used tire through buffing to form a base tire, and then adhering vulcanized precured treads having the tread patterns of new tires. Remolded retread tires are manufactured by removing the tread rubber of a used tire through buffing to form a base tire, winding unvulcanized tread rubber onto the base tire, and then using a molding die having a tread pattern for vulcanization molding.

There is a demand to improve the yield of the base tires in retread tires.

SUMMARY

The present technology provides a pneumatic tire that can improve the yield of the base tire used in retread tires.

A pneumatic tire according to the present technology has: a carcass layer; a belt layer disposed on an outer side in a tire radial direction of the carcass layer; tread rubber disposed on an outer side in the tire radial direction of the belt layer; at least three circumferential main grooves extending in a tire circumferential direction; and a plurality of land portions defined by the circumferential main grooves. Upon left and right circumferential main grooves on the outermost side in a tire width direction being referred to as outermost circumferential main grooves and left and right land portions on an outer side in the tire width direction that are defined by the outermost circumferential main grooves being referred to as shoulder land portions, the belt layer is formed by laminating a pair of cross belts having a belt angle with an absolute value from 10° to 45° both inclusive and mutually opposite signs, and a circumferential reinforcing layer having a belt angle within a range of ±5° relative to the tire circumferential direction; a distance Gcc from a tread profile to a tire inner circumferential surface along a tire equatorial plane and a distance Gsh from a tread edge to the tire inner circumferential surface have a relationship satisfying $1.10 \leq Gsh/Gcc$; and the groove depth Dsh and under-groove gauge UDsh of the outermost circumferential main groove have a relationship satisfying $0.20 \leq UDsh/Dsh$.

In the pneumatic tire according to the present technology, (1) because the ratio Gsh/Gcc is set to a high value, the tread face as a whole has a flat (substantially parallel to the tire rotational axis) shape, and further, the volume of tread rubber (distance Gsh) in the shoulder part is assured. Thus, there is an advantage that the strain on each of the belt plies is reduced when the tire makes contact with the ground, and belt separation resistance performance is improved. In addition, (2) since the ratio Gsh/Gcc is set to a high value and the shoulder portion has a thick structure, the amount of buffing can be properly assured while preventing exposure of the belt ply during retreading of used tires. Thus, there is an advantage that the yield of the base tire is improved.

BRIEF DESCRIPTION OF THE DRAWINGS

FIG. 15 is a table showing the results of performance testing of pneumatic tires according to embodiments of the present technology.

FIG. 16 is a table showing the results of performance testing of pneumatic tires according to embodiments of the present technology.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, a plurality of modified examples that are described in the embodiment can be freely combined within a scope of obviousness for a person skilled in the art.

Pneumatic Tire

Figure 1:
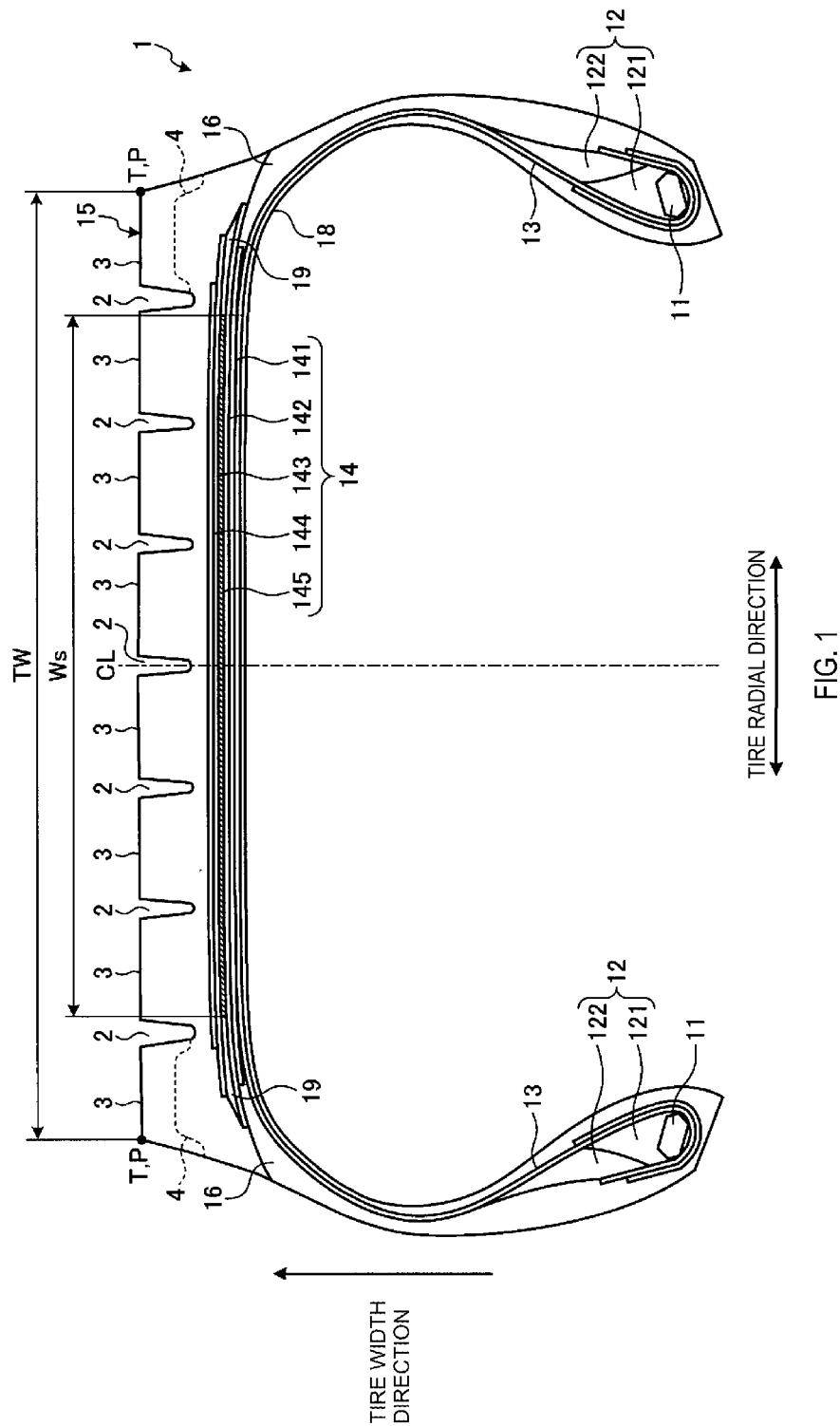
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. In this drawing, a radial tire for heavy loads that is mounted on trucks, buses, and the like for long-distance transport is illustrated as an example of the pneumatic tire 1. Note that the symbol CL refers to a tire equator plane. Moreover, a tread edge P and a tire ground contact edge T are in accord with each other in FIG. 1. The circumferential reinforcing layer 145 in FIG. 1 is indicated by hatching.

This pneumatic tire 1 includes a pair of bead cores 11,11, a pair of bead fillers 12,12, a carcass layer 13, a belt layer 14, tread rubber 15, and a pair of side wall rubbers 16,16 (see FIG. 1).

The pair of bead cores 11,11 have annular structures and constitute cores of left and right bead portions. The pair of bead fillers 12,12 are formed from a lower filler 121 and an upper filler 122, and are disposed on a periphery of both of the pair of bead cores 11,11 in the tire radial direction so as to reinforce the bead portions.

The carcass layer 13 stretches between the left and right side bead cores 11 and 11 in toroidal form, forming a framework for the tire. Additionally, both end portions of the carcass layer 13 are folded from an inner side in a tire width direction toward an outer side in the tire width direction and fixed so as to wrap around the bead cores 11 and the bead fillers 12. In addition, the carcass layer 13 is constituted by a plurality of carcass cords formed from steel or organic fibers (e.g. nylon, polyester, rayon, or the like), covered by a coating rubber, and subjected to a rolling process, and has a carcass angle (the inclination angle of the carcass cord in the fiber direction relative to the tire circumferential direction) with an absolute value from 85° to 95° both inclusive.

The belt layer 14 is formed by laminating a plurality of belt plies 141 to 145, and disposed to extend over a periphery of the carcass layer 13. A detailed configuration of the belt layer 14 is described below.

The tread rubber 15 is disposed on an outer circumference in the tire radial direction of the carcass layer 13 and the belt layer 14, and forms a tread portion of the tire. The pair of side wall rubbers 16,16 is disposed on each outer side of the carcass layer 13 in the tire width direction, so as to form left and right sidewall portions of the tire.

In the configuration illustrated in FIG. 1, the pneumatic tire 1 includes seven circumferential main grooves 2 that extend in a tire circumferential direction, and eight land portions 3 partitioned and formed by the circumferential main grooves 2. In addition, left and right shoulder land portions 3 respectively have a plurality of lug grooves 4 extending in the tire width direction and opening to a buttress portion. In addition, the land portions 3 are formed of blocks that are segmented in the tire circumferential direction by ribs or lug grooves 4 that continue in the tire circumferential direction.

Here, "circumferential main grooves" refers to circumferential grooves having a groove width of 5.0 mm or greater. The groove width of the circumferential main grooves is measured excluding the notched portions and/or the chamfered portions formed at the groove opening portion.

Additionally, in this pneumatic tire 1, the left and right outermost circumferential main grooves 2, 2 in the tire width direction are referred to as outermost circumferential main grooves. Moreover, the left and right land portions 3, 3 on the outer side in the tire width direction that are defined by the left and right outermost circumferential main grooves 2, 2 are referred to as shoulder land portions.

[Belt Layer]

Figure 2:
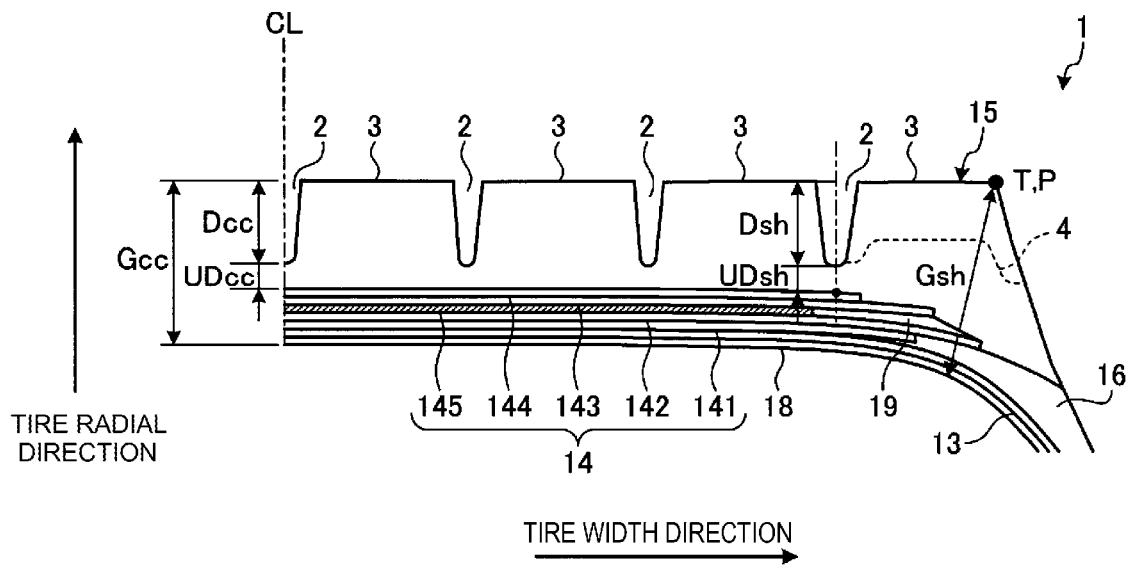
FIG. 2 is an explanatory view illustrating a belt layer of the pneumatic tire depicted in FIG. 1.
Figure 3:
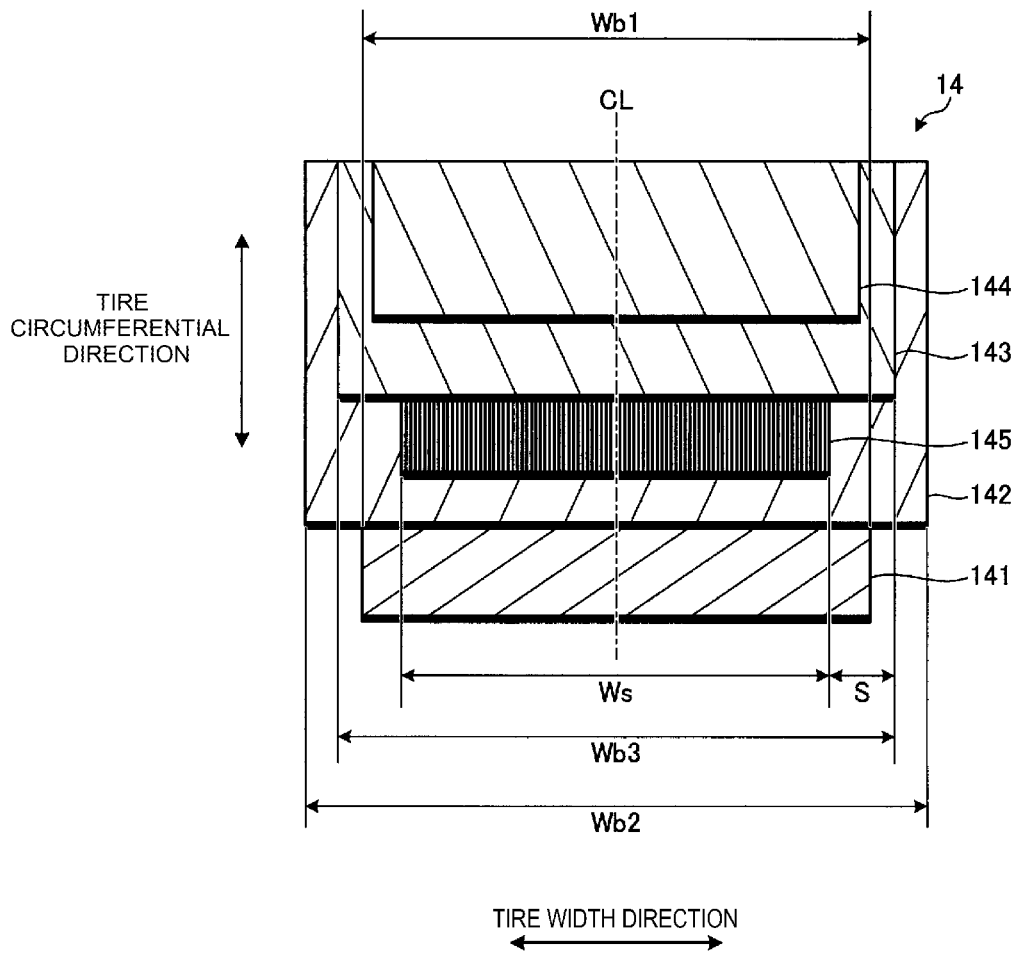
FIG. 3 is an explanatory view illustrating a belt layer of the pneumatic tire depicted in FIG. 1.

FIGS. 2 and 3 are explanatory views illustrating a belt layer of the pneumatic tire depicted in FIG. 1. Among these drawings, FIG. 2 illustrates an area on one side of a tread portion demarcated by the tire equatorial plane CL, and FIG. 3 illustrates a laminated structure of the belt layer 14. Furthermore, the thin lines in the belt plies 141 to 145 in FIG. 3 schematically represent the respective belt cords of the belt plies 141 to 145.

The belt layer 14 is formed by laminating a large angle belt 141, a pair of cross belts 142, 143, a belt cover 144, and a circumferential reinforcing layer 145, and is disposed by being wound and mounted onto the periphery of the carcass layer 13 (see FIG. 2).

The large angle belt 141 is constituted by a plurality of belt cords formed from steel or organic fibers, covered by coating rubber, and subjected to a rolling process, having a belt angle with an absolute value from 45° to 70° both inclusive (the angle of inclination of the fiber direction of the belt cords relative to the tire circumferential direction). In addition, the large angle belt 141 is disposed laminated on the outer side in the tire radial direction of the carcass layer 13.

The pair of cross belts 142, 143 are constituted by a plurality of belt cords formed from steel or organic fibers, covered by coating rubber, and subjected to a rolling process, having a belt angle with an absolute value from 45° to 70° both inclusive. In addition, the pair of cross belts 142, 143 have belt angles that are of mutually opposite signs, and are laminated such that the fiber directions of the belt cords intersect each other (a crossply structure). In the following description, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be disposed laminated (not illustrated). Moreover, in this embodiment, the pair of cross belts 142, 143 are disposed laminated on the outer side in the tire radial direction of the large angle belt 141.

In addition, the belt cover 144 is constituted by a plurality of belt cords formed from steel or organic fibers, covered by coating rubber, and subjected to a rolling process, having a belt angle with an absolute value from 10° to 45° both inclusive. Moreover, the belt cover 144 is disposed laminated on the outer side in the tire radial direction of the cross belts 142, 143. In this embodiment, the belt cover 144 has the same belt angle as the outer-side cross belt 143, and is disposed in the outermost layer of the belt layer 14.

The circumferential reinforcing layer 145 is constituted by belt cords formed from steel, and covered by coating rubber that are wound in a spiral manner with an inclination within a range of ±5° relative to the tire circumferential direction. Moreover, in this embodiment, the circumferential reinforcing layer 145 is disposed interposed between the pair of cross belts 142, 143. In addition, the circumferential reinforcing layer 145 is disposed on the inner side in the tire width direction from left and right edge portions of the pair of cross belts 142, 143. Specifically, the circumferential reinforcing layer 145 is formed by winding one or a plurality of wires in a spiral manner around the periphery of the inner-side cross belt 142. This circumferential reinforcing layer 145 reinforces the stiffness in the tire circumferential direction. As a result, the tire durability is improved.

In this pneumatic tire 1, the belt layer 14 may have an edge cover (not illustrated). In general, the edge cover is constituted by a plurality of belt cords formed from steel or organic fibers, covered by coating rubber, and subjected to a rolling process, having a belt angle with an absolute value from 0° to 5° both inclusive. Additionally, edge covers are disposed on the outer side in the tire radial direction of the left and right edge portions of the outer-side cross belt 143 (or the inner-side cross belt 142). The edge covers improve the uneven wear resistance performance of the tire by reducing the difference in radial growth between the center area and the shoulder area of the tread portion, by exhibiting a hoop effect.

[Belt Edge Separation Suppression Structure and Base Tire Yield Improving Structure]

Recent heavy duty tires mounted on trucks and buses and the like maintain their tread shape due to the tires having a low aspect ratio while having a circumferential reinforcing layer disposed in the belt layer. Specifically, by disposing the circumferential reinforcing layer at the tread center region, and exploiting the hoop effect thereof, radial growth of the tread is suppressed and the tread shape is maintained.

The issue with configurations having a circumferential reinforcing layer is that the rigidity of the belt layer in the tire circumferential direction increases due to the circumferential reinforcing layer, so the separation of the surrounding rubber on the edge portion of the belt ply is likely to occur. This issues becomes particularly pronounced under conditions of long-term use with high inner pressure and high load.

In recent years, there has been a focus on retread tires due to cost and environmental concerns. Retread tires are reused tires wherein the tread rubber of tires that have reached the end of their useful life is replaced, and are manufactured by two methods: precuring and remolding. Precured retread tires are manufactured by removing the tread rubber of a used tire through buffing to form a base tire, and then adhering vulcanized precured treads having the tread patterns of new tires to the base tire. Remolded retread tires are manufactured by removing the tread rubber of a used tire through buffing to form a base tire, winding unvulcanized tread rubber onto the base tire, and then using a molding die having a tread pattern for vulcanization molding.

Base tires are acquired through a process in which used tires undergo buffing while in an inflated state. When this happens the radial growth of tires, particularly used tires having a low aspect ratio, enlarges in the left and right shoulder region. In doing so, the end portions of belt ply in the shoulder regions are likely to be exposed to the surface of the base tire through buffing. Such base tires cannot be used as retread tires, and require a device to increase the yield of the base tire.

In addition, since the base tire is acquired from a used tire, sometimes belt edge separation (separation of the surrounding rubber on the belt layer end portions) occurs. Since such a base tire cannot be used as a retread tire, a device of suppressing belt edge separation of new tires is required. Furthermore, belt edge separation of the base tire inner portion cannot be determined from the outward appearance of a tire, testing is performed to determine whether or not it has occurred with a dedicated tester.

Therefore, this pneumatic tire 1 adopts the following configuration in order to assure belt edge separation resistance performance while increasing the yield of the base tire (see FIG. 1 to FIG. 3).

As illustrated in FIG. 2, in this pneumatic tire 1, a distance Gcc from the tread profile to the tire inner circumferential surface along the tire equatorial plane CL and a distance Gsh from the tread edge P to the tire inner circumferential surface have a relationship satisfying $1.10 \leq Gsh/Gcc$. As shown by the results of a performance test described below (see FIG. 15), this ratio Gsh/Gcc is particularly preferably within the range of $1.20 \leq Gsh/Gcc$.

On the other hand, the upper limit of the ratio Gsh/Gcc is not particularly limited, but when the tire is assembled on a specified rim, inflated to a specified internal pressure, and in an unloaded state, the radius along the tread edge P of the tread profile is preferably less than or equal to the radius along the tire equatorial plane CL. That is, the tread profile has a linear shape or an arc shape having a center on the inner side in the tire radial direction, and is configured so as not to have a reverse R shape (arc shape having a center on the outer side in the tire radial direction). For example, in a configuration having a square shoulder portion as in FIG. 2, the upper limit of the ratio Gsh/Gcc is approximately from 1.4 to 1.5. On the other hand, in a configuration having a round shoulder portion as in FIG. 13 the upper limit of the ratio Gsh/Gcc is approximately from 1.3 to 1.4.

The distance Gcc is measured as the distance from the intersection of the tire equatorial plane CL and the tread profile to the intersection of the tire equatorial plane CL and the tire inner circumferential surface when viewed as a cross-section from the tire meridian direction. Therefore, in a configuration having a circumferential main groove 2 at the tire equatorial plane CL such as the configuration illustrated in FIG. 1 and FIG. 2, the distance Gcc is measured omitting the circumferential main groove 2. The distance Gsh is measured as the length of a perpendicular line from the tread edge P to the tire inner circumferential surface when viewed as a cross-section from the tire meridian direction.

In the configuration illustrated in FIG. 2, the pneumatic tire 1 includes an inner liner 18 on the inner circumferential surface of the carcass layer 13, and the inner liner 18 is disposed across the entire region of the tire inner circumferential surface. In such a configuration, the distance Gcc and the distance Gsh are measured on the basis of the outer surface of the inner liner 18 (tire inner circumferential surface).

The tread edge P (1) refers to a point of the tread edge portion in a configuration having a square shaped shoulder portion. For example, in the configuration illustrated in FIG. 2, the tread edge P and a tire ground contact edge T coincide with each other due to the shoulder portion having a square shape. Conversely, (2) in a configuration in which the shoulder portion has a round shape, as illustrated in the modification example of FIG. 13 be described later, taking an intersection P' between the tread portion profile and the side wall portion profile when viewed as a cross-section from the tire meridian direction, the tread edge P is taken as the bottom of a perpendicular line drawn from the intersection P' to the shoulder portion.

Additionally, the "tire ground contact edge T" refers to the maximum width position in a tire axial direction of a contact surface between the tire and a flat plate in a configuration in which the tire is assembled on a specified rim, inflated to a specified internal pressure, placed perpendicularly to the flat plate in a static state, and loaded with a load corresponding to a specified load.

Here, "specified rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Specified internal pressure" refers to "maximum air pressure" stipulated by JATMA, a maximum value in "tire load limits at various cold inflation pressures" defined by TRA, and "inflation pressures" stipulated by ETRTO. Note that "specified load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the specified internal pressure is an air pressure of 180 kPa, and the specified load is 88% of the maximum load capacity.

Figure 4A:
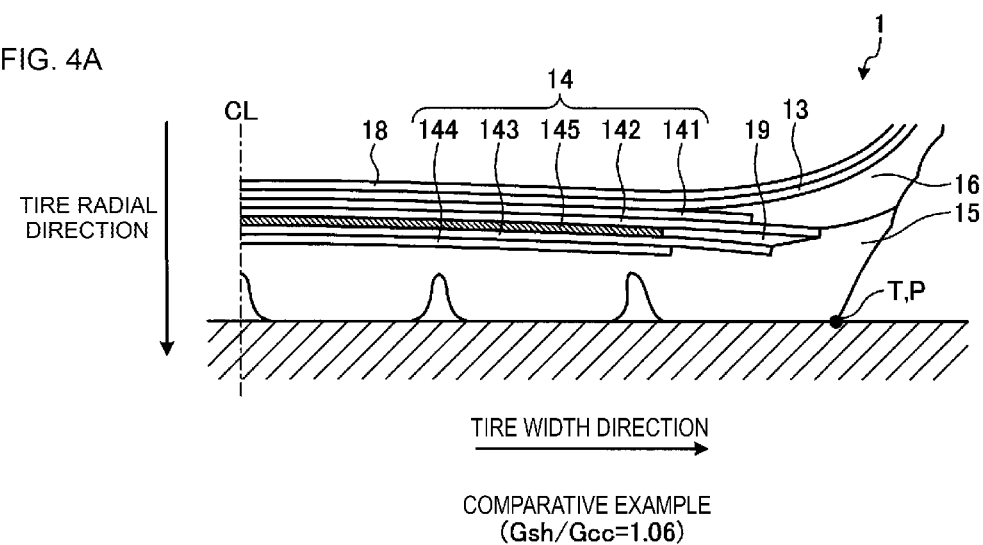
FIGS. 4A and 4B are explanatory views illustrating the effect of the pneumatic tire depicted in FIG. 1.
Figure 4B:
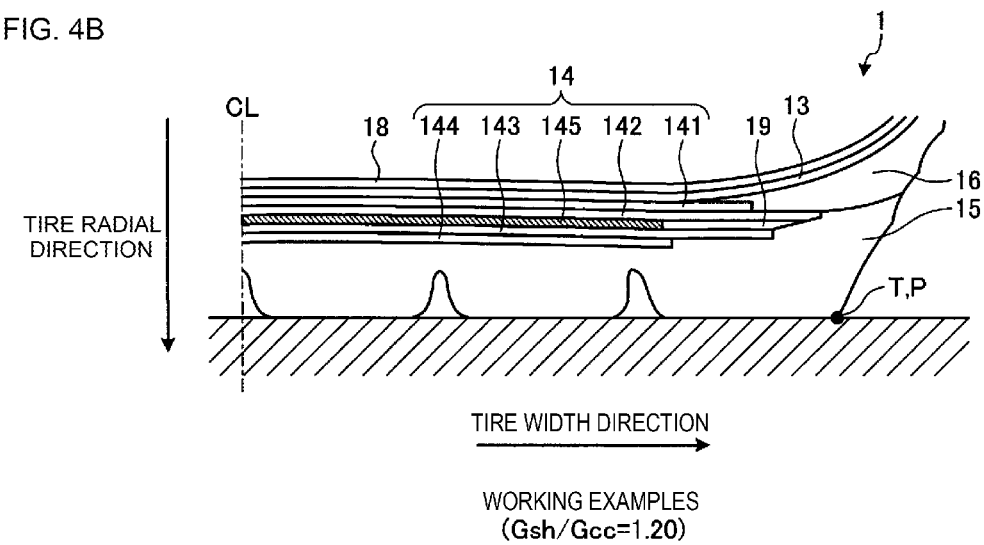
Figure 5:
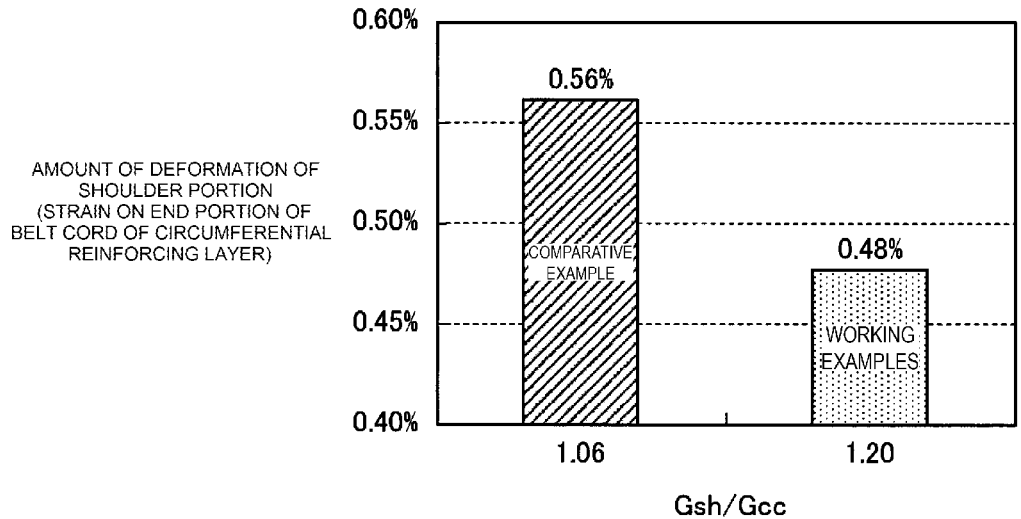
FIG. 5 is an explanatory view showing the effect of the pneumatic tire depicted in FIG. 1.

FIGS. 4A, 4B, and 5 are explanatory views illustrating the operation of the pneumatic tire depicted in FIG. 1. In these diagrams, FIGS. 4A and 4B illustrate the states of ground contact of tires having mutually different ratios Gsh/Gcc, and FIG. 5 shows the amounts of deformation of the shoulder portion at the time of ground contact (strain on end portions of belt cord of circumferential reinforcing layer 145) of each of the tires of FIGS. 4A and 4B.

In the tire of a comparative example of FIG. 4A, in the configurations of FIGS. 1 to 3, the ratio Gsh/Gcc is set to a small value (Gsh/Gcc=1.06). For this reason, when the tire does not contact the ground, the tread profile has a counterbore shape in which the outside diameter decreases from the tire equatorial plane CL toward the tread edge P (not illustrated). In so doing, when the tire makes ground contact, as illustrated in FIG. 4A, the tread rubber on the shoulder portion deforms greatly on the road surface side (outer side in the tire radial direction), and each of the belt plies 141 to 145 of the belt layer 14 curves greatly on the road surface side (outer side in the tire radial direction) toward the outer side in the tire width direction. As a result, since the strain on each of the belt plies 141 to 145 increases, (1) separation of the surrounding rubber on the end portions of each of the belt plies 141 to 145 is likely to occur, and additionally, (2) separation of the coating rubber between adjacent belt plies 141 to 145 is likely to occur. Separation of the surrounding rubber on the end portion of the circumferential reinforcing layer 145, and separation of the coating rubber between the pair of cross belts 142, 143 interposing the circumferential reinforcing layer 145 and the circumferential reinforcing layer 145, are particularly likely to occur.

In contrast, in the tire of a comparative example of FIG. 4B, in the configurations of FIGS. 1 to 3, the ratio Gsh/Gcc is set to a large value (Gsh/Gcc=1.20). For this reason, when the tire does not contact the ground, the difference in diameter between the outside diameter of the tread profile at the tire equatorial plane CL and the outside diameter at the tread edge P is small, and as a whole, the tread face has a flat (substantially parallel to the tire rotational axis) shape (see FIGS. 1 and 2). Furthermore, the volume (distance Gsh) of the tread rubber 15 at the shoulder portion is assured, and rigidity of the shoulder land portion 3 is assured. As a result, deformation of the shoulder portion is suppressed when the tire makes ground contact, and the strain on each of the belt plies 141 to 145 is reduced (see FIG. 4A). Thus, (1) separation of the surrounding rubber on the end portion of each of the belt plies 141 to 145, and (2) separation of the coating rubber between adjacent belt plies 141 to 145, is suppressed.

In addition, if the pneumatic tire 1 is reused as a retreated tire, then, as described above, a portion of the tread rubber of a used tire is removed to acquire a base tire. In this buffing process, the amount of buffing (amount of tread rubber removed by buffing) is stipulated so that (1) the groove bottom line of each of the circumferential main grooves 2 does not remain on the surface of the base tire, (2) the belt ply is not exposed to the surface of the base tire, and (3) the shoulder wear of the used tire (particularly, step wear) does not remain on the surface of the base tire. Specifically, the amount of buffing is prescribed on the basis of the groove depth Dcc of the circumferential main groove 2 in the vicinity of the tire equatorial plane CL, the groove depth Dsh of the outermost circumferential main groove 2, and the position of the opening end portion 41 of the lug groove 4 of the shoulder land portion 3.

When this happens, as described above, as a high ratio Gsh/Gcc is set and the shoulder portion has a thick structure, the amount of buffing can be properly assured while preventing exposure of the belt ply. Thus, the yield of the base tire is improved.

In addition, in this pneumatic tire 1, as depicted in FIG. 2, the groove depth Dsh and under-groove gauge UDsh of the outermost circumferential main groove 2 have a relationship satisfying $0.20 \leq UDsh/Dsh$.

In addition, the groove depth Dcc and the under-groove gauge UDcc of the circumferential main groove 2 closest to the tire equatorial plane CL have a relationship satisfying $0.15 \leq UDcc/Dcc$. In addition, the lower limit of the ratio UDcc/Dcc is more preferably within a range of $0.20 \leq UDcc/Dcc$.

Furthermore, although the upper limits of the ratio UDsh/Dsh and the ratio UDcc/Dcc are not particularly limited, if the under-groove gauges UDsh, UDcc are too large, the tread gauge will increase and the tire rolling resistance will decrease, so this is not preferred. Consequently, the upper limits of the ratio UDsh/Dsh and the ratio UDcc/Dcc are preferably properly set with consideration given to this point. Specifically, the ratio UDsh/Dsh and the ratio UDcc/Dcc are preferably within a range of $UDsh/Ds \leq 0.7$ and $UDcc/Dcc \leq 0.7$.

In addition, the ratio UDsh/Dsh and the ratio UDcc/Dcc preferably have a relationship satisfying $UDcc/Dcc < UDsh/Dsh$. Consequently, the under-groove gauge ratio UDsh/Dsh of the outermost circumferential main groove 2 is set to a value larger than the under-groove gauge ratio UDcc/Dcc of the circumferential main groove 2 in the vicinity of the tire equatorial plane CL. Thus, the groove depths Dsh, Dcc of each of the circumferential main grooves 2 can be made appropriate, while achieving a tread shape having the ratio Gsh/Gcc described above.

In addition, the groove depth Dsh of the outermost circumferential main groove 2, and the groove depth Dcc of the circumferential main groove in the vicinity of the tire equatorial plane CL, preferably have a relationship satisfying $1.0 \leq Dsh/Dcc \leq 1.2$. Thus, the ratio Dsh/Dcc of the groove depth is made appropriate.

Furthermore, in a configuration in which there is a circumferential main groove 2 between the circumferential main groove 2 nearest the tire equatorial plane CL and the outermost circumferential main groove 2 (see FIG. 1 and FIG. 2), in general, the depth and under-groove gauge of these circumferential main grooves 2 are set as appropriate on the basis of the depths Dsh, Dcc and under-groove gauges UDsh and UDcc described above.

The groove depths Dsh, Dcc of the circumferential main grooves 2 are measured as the distance between the tread profile and the groove bottom (deepest position) of the circumferential main grooves 2. In addition, the groove depths Dsh, Dcc are measured excluding the raised bottom portion such as a stone ejector formed on the groove bottom. In addition, although the groove depths Dsh, Dcc depend upon the tire size, in general, they are set to within a range of $10 \text{ mm} \leq Dsh \leq 25 \text{ mm}$ and $10 \text{ mm} \leq Dcc \leq 25 \text{ mm}$.

The under-groove gauges UDsh, UDcc of the circumferential main grooves 2 are measured as the distance between the groove bottoms of the circumferential main grooves 2 and the belt layer 14 (in more detail, an arc joining the tops on the outer side in the tire radial direction of the belt cords of the belt ply on the outermost side in the tire radial direction).

The circumferential main groove 2 nearest the tire equatorial plane CL refers to the circumferential main groove 2 on the tire equatorial plane CL if there is one present (see FIG. 2), or the circumferential main groove 2 at the position nearest from the tire equatorial plane CL of a plurality of circumferential main grooves 2 when there is a land portion 3 (no circumferential main groove 2) on the tire equatorial plane CL (not illustrated).

In the configuration described above, since the under-groove gauges UDsh, UDcc of the circumferential main grooves 2 are properly assured, a sufficient amount of buffing can be assured so that no shoulder wear on the used tire remains on the surface of the base tire. Thus, the yield of the base tire is improved.

[Rehabilitation Time Decision Mark Lug Grooves]

As described above, in a tire having a circumferential reinforcing layer on the belt layer, shoulder wear is likely to occur. When this shoulder wear is very advanced, the shoulder wear cannot be removed through buffing, and as a result, the used tire cannot be retreaded. This is because when a large amount of buffing is performed to remove the shoulder wear, the end portion of the belt layer is exposed to the surface of the base tire.

On the other hand, whether or not a used tire is retreadable, that is, whether or not the end portion of the belt layer will be exposed to the surface of the base tire, is often determined after buffing. However, this negates the buffing process and poses drawbacks for users (mainly tire dealers that perform buffing), and so this is not preferred.

Therefore, this pneumatic tire 1 has the following configuration so that a user can properly determine the rehabilitation period of a tire.

FIG. 6 to FIG. 9 are an enlarged cross-sectional views illustrating the shoulder portion of the pneumatic tire depicted in FIG. 1. These drawings all illustrate a pneumatic tire 1 having the same structure, and additionally, illustrate a shoulder portion when a tire has been mounted on a specified rim, inflated to a specified internal pressure, and in an unloaded state.

Figure 6:
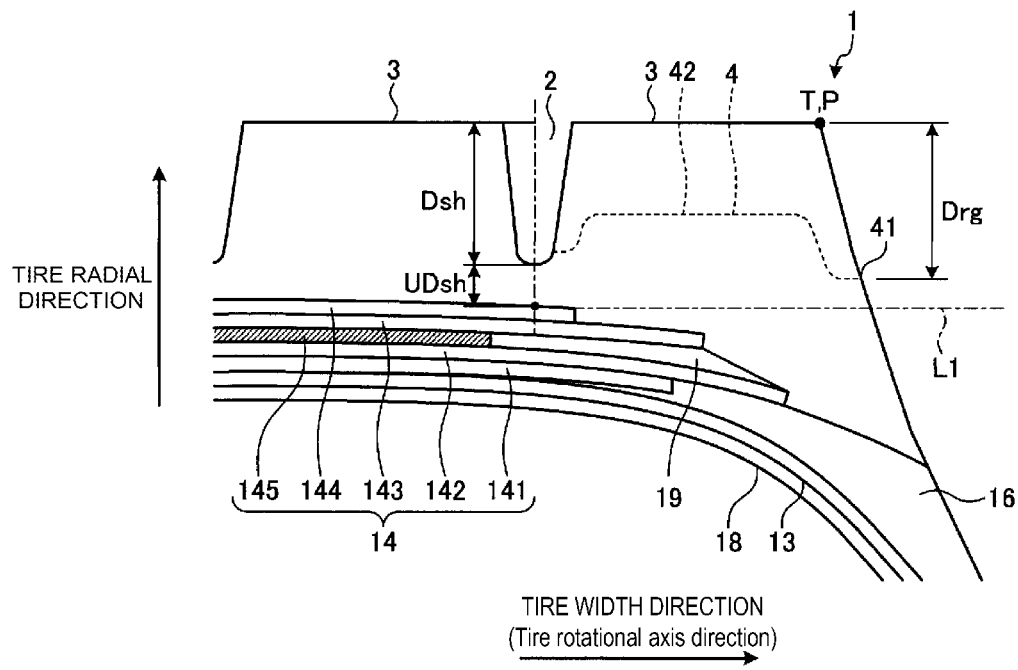
FIG. 6 is an enlarged cross-sectional view illustrating the shoulder portion of the pneumatic tire depicted in FIG. 1.

First, as illustrated in FIG. 6, a straight line L1 parallel to the tire rotational axis is drawn from the end portion of the plurality of belt plies 141 to 145 constituting the belt layer 14 that is on the outer side in the tire width direction from the outermost circumferential main groove 2 and the outermost side in the tire radial direction.

When this happens, the opening end portion 41 of the lug groove 4 in this pneumatic tire 1 is disposed on the outer side in the tire radial direction from the straight line L1. Specifically, the opening end portion 41 of the lug groove 4 is preferably disposed at a distance of 2 mm or greater from the straight line L1. Then, the opening end portion 41 of the lug groove 4 can be used as a mark for deciding the rehabilitation period of a tire.

In such a configuration, as wear advances, shoulder wear occurs on the edge portion on the outer side in the tire width direction of the shoulder land portion 3. Then, a used tire is decided as being retreadable before the shoulder wear reaches the opening end portion 41 of the lug groove 4, and is decided as being unretreadable if the shoulder wear exceeds the opening end portion 41 of the lug groove 4. That is, whether or not a tire is retreadable is decided on the basis of whether or not the opening end portion 41 of the lug groove 4 has disappeared due to shoulder wear. In addition, when the shoulder wear has reached the opening end portion 41 of the lug groove 4 is the recommended rehabilitation period. Under these conditions, the position of the opening end portion 41 of the lug groove 4 is made appropriate as described above, and exposure of the belt layer to the base tire surface can be prevented while removing the shoulder wear portion through buffing. Thus, the opening end portion 41 of the lug groove 4 functions as a mark for deciding the rehabilitation period of a tire.

Figure 7:
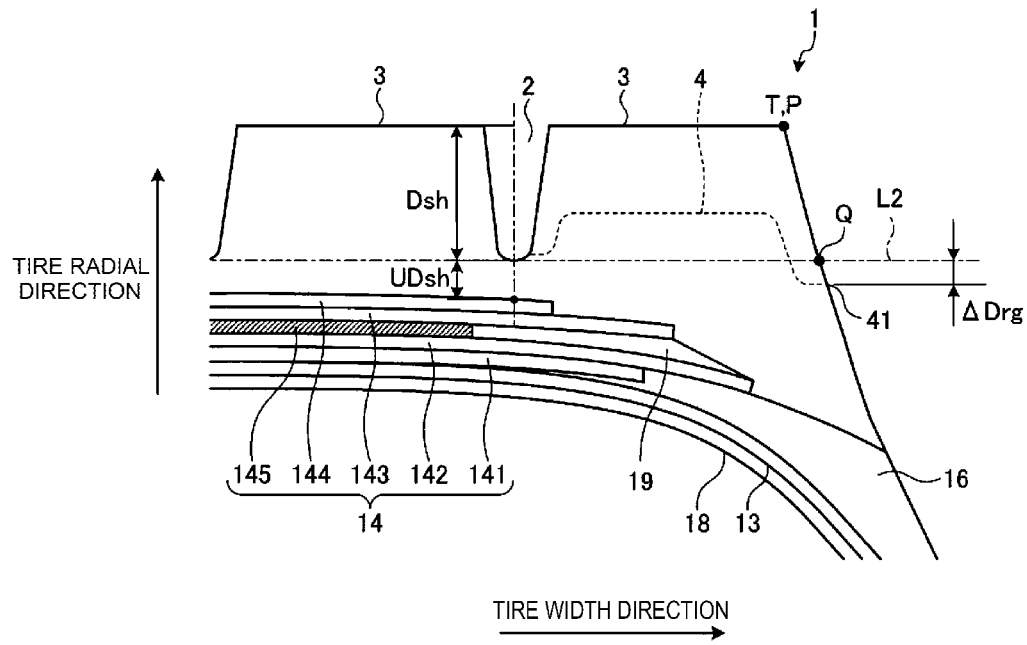
FIG. 7 is an enlarged cross-sectional view illustrating the shoulder portion of the pneumatic tire depicted in FIG. 1.

In addition, as illustrated in FIG. 7, a curved line L2 parallel to the tire profile is drawn passing through the groove bottom of the outermost circumferential main groove 2 when viewed as a cross-section from the tire meridian direction. In addition, an intersection Q between the curved line L2 and buttress portion is taken.

When this happens, all of the belt plies 141 to 145 constituting the belt layer 14 are on the inner side in the tire radial direction from the curved line L2. In particular, the end portions of all of the belt plies 141 to 145 on the outer side in the tire width direction from the outermost circumferential main groove 2 are on the inner side in the tire radial direction from the curved line L2. Thus, exposure of the belt layer to the base tire surface during buffing is prevented.

In addition, the under-groove gauge UDsh of the outermost circumferential main groove 2, and the distance ΔDrg in the tire radial direction from the intersection Q to the opening end portion 41 of the lug groove 4, taking the outer side in the tire radial direction as being positive, have a relationship satisfying $-1.0 \leq \Delta Drg/UDsh \leq 1.0$. In addition, the ratio ΔDrg/UDsh is preferably set to have a relationship satisfying $-1.0 \leq \Delta Drg/UD < 0$, and more preferably $-0.5 \leq \Delta Drg/UDsh \leq -0.1$. Thus, as a result of the opening end portion 41 of the lug groove 4 being disposed on the inner side in the tire radial direction from the intersection Q, the rehabilitation period of the tire can be delayed, and the primary life of the tire extended. In addition, as a result of the ratio ΔDrg/UDsh being within a range of $-1.0 \leq \Delta Drg/UDsh$, whether or not a tire is retreadable can be precisely decided.

Figure 8:
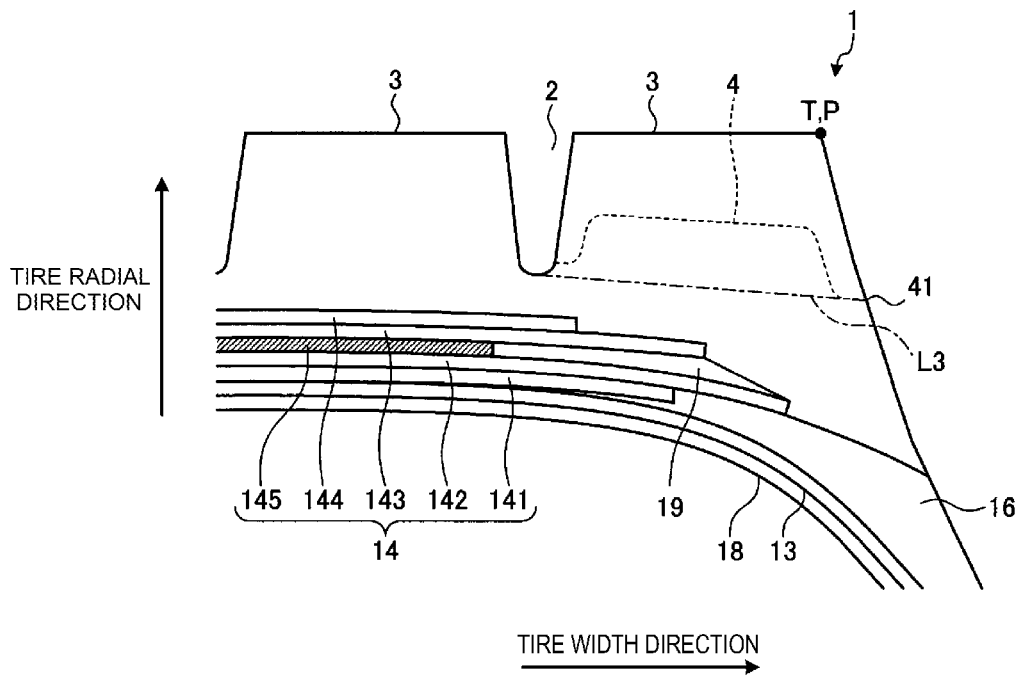
FIG. 8 is an enlarged cross-sectional view illustrating the shoulder portion of the pneumatic tire depicted in FIG. 1.

In addition, as illustrated in FIG. 8, a straight line L3 is drawn joining the groove bottom of the outermost circumferential main groove 2 and the opening end portion 41 of the lug groove 4 when viewed as a cross-section from the tire meridian direction.

When this happens, all of the belt plies 141 to 145 constituting the belt layer 14 are on the inner side in the tire radial direction from the straight line L3. Thus, exposure of the belt layer to the base tire surface during buffing is prevented.

Figure 9:
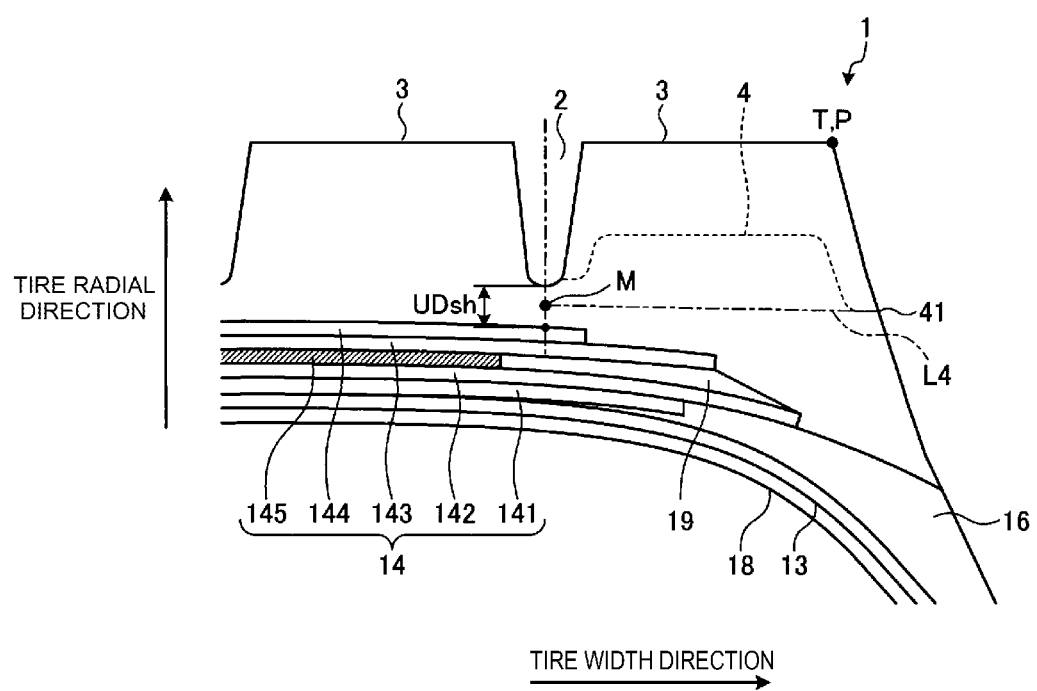
FIG. 9 is an enlarged cross-sectional view illustrating the shoulder portion of the pneumatic tire depicted in FIG. 1.

In addition, as illustrated in FIG. 9, a straight line L4 is drawn joining the midpoint M of the under-groove gauge UDsh of the outermost circumferential main groove 2 and the opening end portion 41 of the lug groove 4 when viewed as a cross-section from the tire meridian direction. The midpoint M of the under-groove gauge UDsh refers to the midpoint of two points defining the under-groove gauge UDsh.

When this happens, all of the belt plies 141 to 145 constituting the belt layer 14 are on the inner side in the tire radial direction from the straight line L4. Thus, exposure of the belt layer to the base tire surface during buffing is prevented.

In addition, in FIG. 6, the groove depth Dsh and under-groove gauge UDsh of the outermost circumferential main groove, and the distance ΔDrg in the tire radial direction from the tire ground contact edge T to the opening end portion 41 of the lug groove 4, have a relationship satisfying 0.7≤Drg/(Dsh+UDsh)≤1.1. Thus, whether or not a tire is retreadable can be precisely decided.

[Additional Items]

Figure 10:
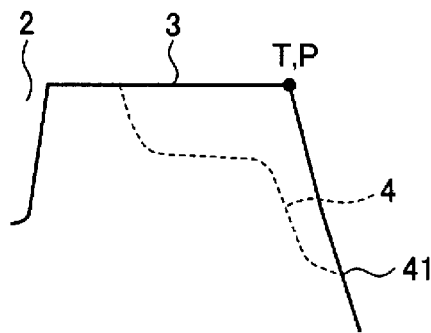
FIG. 10 is an explanatory view illustrating a modified example of the pneumatic tire depicted in FIG. 1.
Figure 11:
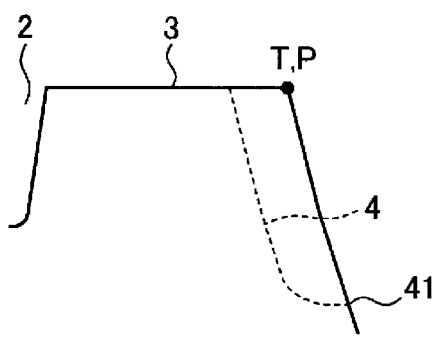
FIG. 11 is an explanatory view illustrating a modified example of the pneumatic tire depicted in FIG. 1.
Figure 12:
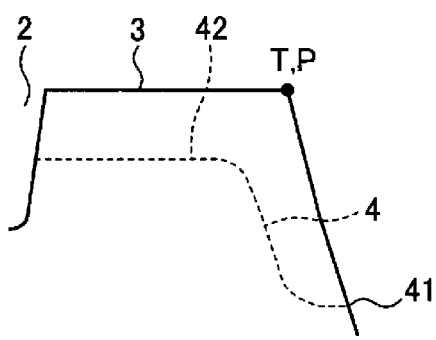
FIG. 12 is an explanatory view illustrating a modified example of the pneumatic tire depicted in FIG. 1.

FIG. 10 to FIG. 12 are explanatory views illustrating a modified example of the pneumatic tire depicted in FIG. 1. These drawings illustrate a modified example of a lug groove 4 of a shoulder land portion 3.

In the configuration in FIG. 6, the lug groove 4 penetrates the shoulder land portion 3 extending in the tire width direction, and respectively opens to the outermost circumferential main groove 2 and the buttress portion. In addition, it has a raised bottom portion 42 within the shoulder land portion 3.

However, it is not limited to this, as long as the lug groove 4 opens at least to the buttress portion. Thus, the opening end portion 41 of the lug groove 4 functions as a mark for deciding the rehabilitation period of a tire.

For example, as illustrated in FIG. 10, the lug groove 4 may open to the buttress portion on a first end portion, and terminate within the shoulder land portion 3 on a second end potion. In addition, as illustrated in FIG. 11, the lug groove 4 may be formed only in the buttress portion, and extend on the inner side in the tire radial direction along the butters portion. In addition, as illustrated in FIG. 12, the lug groove 4 may open to the outermost circumferential main groove 2 raised up by the raised bottom portion 42.

In addition, in FIG. 1, the tread width TW and the width Ws of the circumferential reinforcing layer 145 in this pneumatic tire 1 have a relationship satisfying 0.70≤Ws/TW≤0.90.

The tread width TW is the distance in the tire rotation axis direction between the left and right tread ends P, P, measured when the tire is assembled on a specified rim, inflated to a specified internal pressure and is in an unloaded state.

The width Ws of the circumferential reinforcing layer 145 is the distance measured between the left and right end portions of the circumferential reinforcing layer 145 in the tire rotation direction when the tire is mounted on a specified rim, inflated to a specified internal pressure, and is in an unloaded state. The width Ws of the circumferential reinforcing layer 145 is the distance between the outermost end portions of the divided portions when the circumferential reinforcing layer 145 has a structure that is divided in the tire width direction (not illustrated).

In addition, a common pneumatic tire, as illustrated in FIG. 1, has a left-right symmetrical structure centered on the tire equatorial plane CL. As a result, the distance from the tire equatorial plane CL to the tread edge P is TW/2, and the distance from the tire equatorial plane CL to the circumferential reinforcing layer 145 is Ws/2.

In contrast, in a pneumatic tire having a left-right asymmetrical structure (not illustrated), the range of the ratio Ws/TW between the width Ws of the circumferential reinforcing layer 145 and the tread width TW is stipulated in terms of half-width based on the tire equatorial plane CL. Specifically, the distance TW' (not illustrated) from the tire equatorial plane CL to the tread edge P and the distance Ws' from the tire equatorial plane CL to the end portion of the circumferential reinforcing layer 145 are set to have a relationship satisfying 0.70≤Ws'/TW'≤0.90.

Furthermore, in this pneumatic tire 1, the width Wb1 of the large angle belt 141 and the width Wb3 of the narrower cross belt 143 of the pair of cross belts 142, 143 preferably have a relationship satisfying 0.85≤Wb1/Wb3≤1.05 (see FIG. 3). As a result, the ratio Wb1/Wb3 is made appropriate.

The width Wb1 of the large angle belt 141 and the width Wb3 of the cross belt 143 are measured as the distance in the tire width direction when the tire is mounted on a specified rim, inflated to a specified internal pressure, and is in an unloaded state.

In the configuration in FIG. 1, the belt layer 14 has a structure with left-right symmetry around the tire equatorial plane CL as illustrated in FIG. 3, and the width Wb1 of the large angle belt 141 and the width Wb3 of the narrower cross belt 143 have a relationship satisfying Wb1<Wb3. Hence, an edge portion of the high-angle belt 141 is disposed on the inner side in the tire width direction from the edge portion of the narrower cross belt 143 in the region on one side of the tire equatorial plane CL. However, the configuration is not limited thereto, and the width Wb1 of the large angle belt 141 and the width Wb3 of the narrower cross belt 143 may have a relationship satisfying Wb1≥Wb3 (not illustrated).

Moreover, the belt cords of the large angle belt 141 are preferably steel wire, and the large angle belt 141 preferably has the number of ends from 15 ends/50 mm to 25 ends/50 mm both inclusive (see FIGS. 4A and 4B). Moreover, the belt cords of the pair of cross belts 142, 143 are preferably steel wire, and the pair of cross belts 142, 143 preferably have the number of ends from 18 ends/50 mm to 28 ends/50 mm both inclusive. Also, the belt cords that constitute the circumferential reinforcing layer 145 are steel wire, and the circumferential reinforcing layer 145 preferably has the number of ends from 17 ends/50 mm to 30 ends/50 mm both inclusive. As a result, the strengths of the belt plies 141, 142, 143, 145 are properly assured.

Moreover, a modulus E1 at 100% elongation of the coating rubber of the large angle belt 141 and a modulus Es at 100% elongation of the coating rubber of the circumferential reinforcing layer 145 preferably have a relationship satisfying 0.90≤Es/E1≤1.10 (see FIGS. 4A and 4B). Moreover, moduli E2, E3 at 100% elongation of the coating rubbers of the pair of cross belts 142, 143, and the modulus Es at 100% elongation of the coating rubber of the circumferential reinforcing layer 145 preferably have a relationship satisfying 0.90≤Es/E2≤1.10 and 0.90≤Es/E3≤1.10. Moreover, the modulus Es at 100% elongation of the coating rubber of the circumferential reinforcing layer 145 preferably is in a range satisfying 4.5 MPa≤Es≤7.5 MPa. As a result, the moduli of the belt plies 141, 142, 143, 145 are made appropriate.

The modulus at 100% elongation is measured in a tensile test at ambient temperature in conformance with JIS K6251 (using dumbbell no. 3).

Moreover, a breaking elongation λ1 of the coating rubber of the large angle belt 141 is preferably equal to or greater than 200% (see FIGS. 4A and 4B). Moreover, breaking elongations λ2, λ3 of the coating rubbers of the pair of cross belts 142, 143 are both preferably equal to or greater than 200%. Furthermore, a breaking elongation λs of the coating rubber of the circumferential reinforcing layer 145 is preferably equal to or greater than 200%. As a result, the durability of the belt plies 141 142, 143, 145 is properly assured.

Breaking elongation is measured by performing a tensile test on a test sample of the JIS-K7162 specification 1B shape (dumb bell shape with a thickness of 3 mm) using a tensile tester (INSTRON5585H manufactured by Instron Corp.) conforming to JIS-K7161 at a pulling speed of 2 mm/min.

Elongation is preferably from 1.0% to 2.5% both inclusive when the tensile load of the belt cords as components that configure the circumferential reinforcing layer 145 is from 100 N to 300 N, and is preferably from 0.5% to 2.0% both inclusive when the tensile load is from 500 N to 1000 N as a tire (when removed from the tire). The belt cords (high elongation steel wire) have a good elongation ratio when a low load is applied compared with normal steel wire, so they can withstand the loads that are applied to the circumferential reinforcing layer 145 from manufacture to tire use, so it is possible to suppress damage to the circumferential reinforcing layer 145, which is desirable.

The elongation of the belt cord is measured in accordance with JIS G3510.

Also, as illustrated in FIG. 3, the circumferential reinforcing layer 145 is preferably disposed on the inner side in the tire width direction from the left and right edge portions of the narrower cross belt 143 of the pair of cross belts 142, 143. Also, preferably the width Wb3 of the narrower cross belt 143 and the distance S from the edge portion of the circumferential reinforcing layer 145 to the edge portion of the narrower cross belt 143 have the relationship satisfying 0.03≤S/Wb3≤0.12. As a result, the distance between the end portions of the width Wb3 of the cross belt 143 and the end portions of the circumferential reinforcing layer 145 are properly assured. This point is the same even if the circumferential reinforcing layer 145 has a divided structure (not illustrated).

The distance S of the circumferential reinforcing layer 145 is measured as a distance in the tire width direction when the tire is mounted on a specified rim, inflated to a specified internal pressure, and is in an unloaded state.

Furthermore, in the configuration in FIG. 1, the circumferential reinforcing layer 145 is constituted by a single steel wire wound in a spiral manner, as illustrated in FIG. 3. However, the configuration is not limited thereto, and the circumferential reinforcing layer 145 may also be configured by a plurality of wires wound spirally around side-by-side to each other (multiplexed wound structure). In this case, preferably, the number of wires is 5 or less. Additionally, the width of winding per unit when five wires are wound in a multiplexed manner is preferably not greater than 12 mm. As a result, a plurality of wires (from 2 to 5 wires both inclusive) can be wound properly at a slant within a range of ±5° relative to the tire circumferential direction.

Additionally, in the configuration in FIG. 2, the circumferential reinforcing layer 145 is disposed so as to be interposed between the pair of cross belts 142, 143 (see FIG. 2). However, the circumferential reinforcing layer 145 is not limited as such, and may also disposed on the outer side in the tire radial direction of the pair of cross belts 142, 143 (not illustrated). Additionally, the circumferential reinforcing layer 145 may also be disposed on the inner side of the pair of cross belts 142, 143. For example, the circumferential reinforcing layer 145 may be (1) disposed between the large angle belt 141 and the inner-side cross belt 142, or (2) disposed between the carcass layer 13 and the large angle belt 141 (not illustrated).

Additionally, in this pneumatic tire 1, the breaking elongation of the tread rubber 15 is preferably not less than 350%. Thus, the strength of the tread rubber 15 is assured, and occurrence of tears in the outermost circumferential main groove 2 is suppressed. Furthermore, the maximum breaking elongation of the tread rubber 15 is not particularly limited, but is constrained by the type of rubber compound of the tread rubber 15.

Furthermore, in this pneumatic tire 1, the hardness of the tread rubber 15 is preferably within a range of not greater than 70. Thus, the strength of the tread rubber 15 is assured, and occurrence of tears in the outermost circumferential main groove 2 is suppressed. Furthermore, the maximum hardness of the tread rubber 15 is not particularly limited, but is constrained by the type of rubber compound of the tread rubber 15.

Here, "rubber hardness" refers to JIS-A hardness in accordance with JIS-K6263.

[Round Shaped Shoulder Portion]

Figure 13:
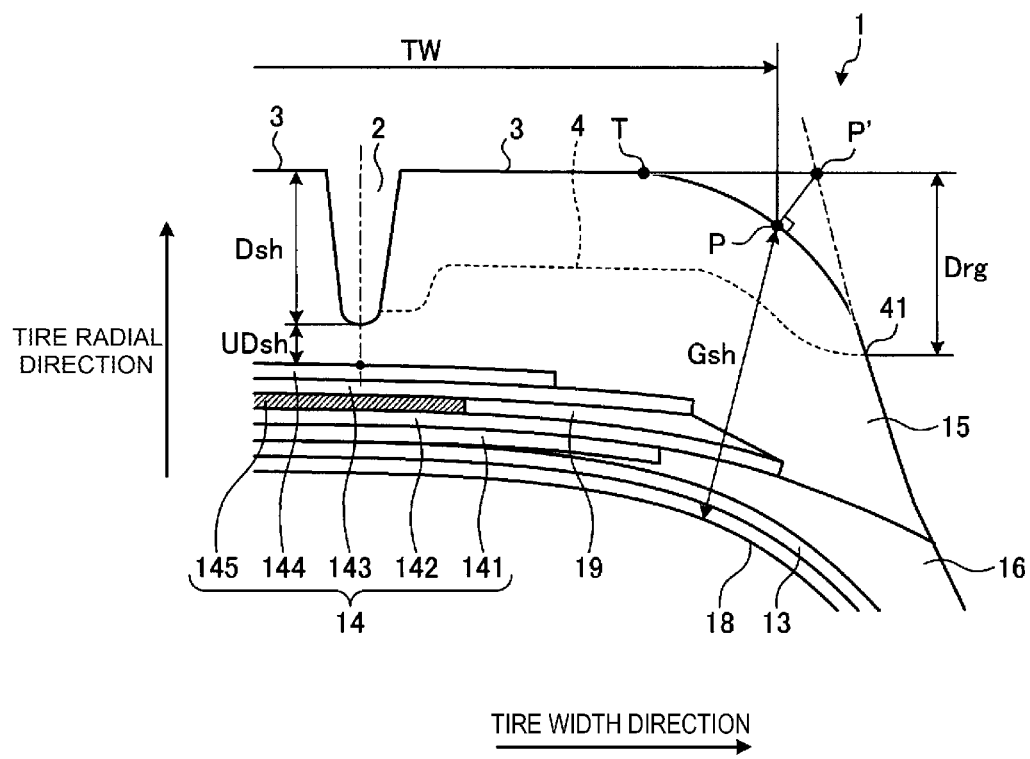
FIG. 13 is an explanatory view illustrating a modified example of the pneumatic tire depicted in FIG. 1.

FIG. 13 is an explanatory view of a modified example of the pneumatic tire depicted in FIG. 1. FIG. 13 illustrates a configuration having a shoulder portion with a round shape.

In the configuration in FIG. 1, the shoulder portion has a square shape, in which the tire ground contact edge T and tread edge P are in accord, as illustrated in FIG. 2.

However, the shoulder portion is not limited as such, and may also have a round shape, as illustrated in FIG. 13. In such a case, an intersection P' is taken from the tread portion profile and the side wall portion profile when viewed as a cross-section from the tire meridian direction, and the tread edge P is taken as the bottom of a perpendicular line drawn from the intersection P' to the shoulder portion. Therefore, the tire ground contact edge T and the tread edge P normally are in mutually different locations.

[Belt Edge Cushion Two-Color Structure]

Figure 14:
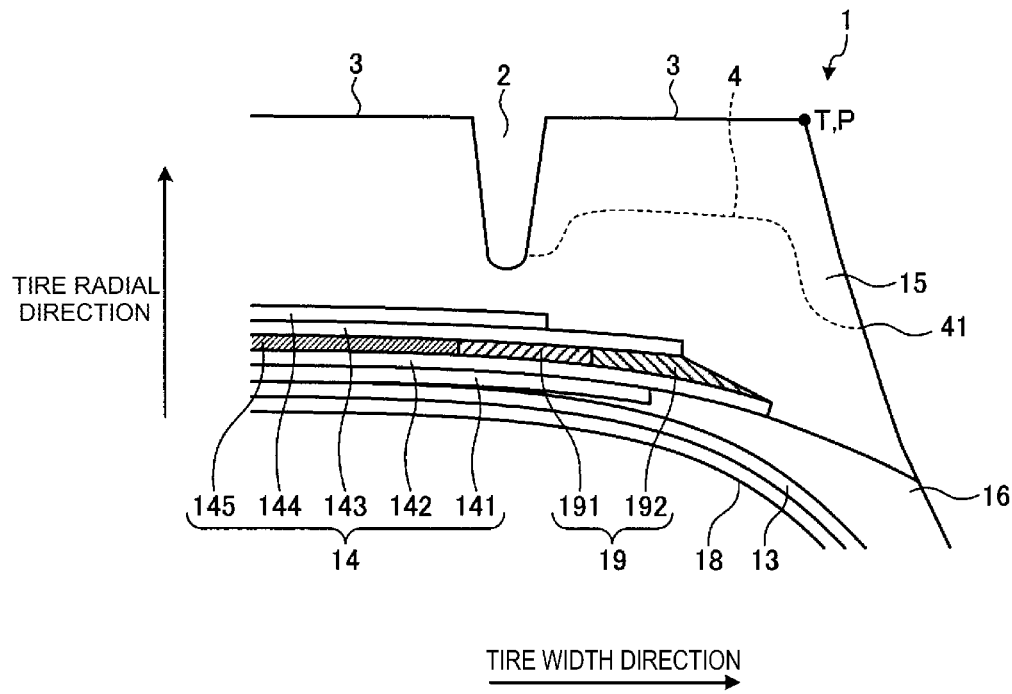
FIG. 14 is an explanatory view illustrating a modified example of the pneumatic tire depicted in FIG. 1.

FIG. 14 is an explanatory view of a modified example of the pneumatic tire depicted in FIG. 1. FIG. 14 is an enlarged view of an end portion of the belt layer 14 on the outer side in the tire width direction. The circumferential reinforcing layer 145 and the belt edge cushion 19 in FIG. 14 are indicated by hatching.

In the configuration illustrated in FIG. 1, the circumferential reinforcing layer 145 is disposed on the inner side in the tire width direction from the left and right edge portions of the narrower cross belt 143 of the pair of cross belts 142, 143. The belt edge cushion 19 is disposed so as to be sandwiched between the pair of cross belts 142, 143 at a position corresponding to the edge portion of the pair of cross belts 142, 143. Specifically, the belt edge cushion 19 is disposed on the outer side of the circumferential reinforcing layer 145 in the tire width direction so as to be adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

In the configuration illustrated in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than the coating rubber of the cross belts 142, 143. Specifically, the modulus E at 100% elongation of the belt edge cushion 19 and a modulus Eco of the coating rubber have a relationship satisfying $0.60 \leq E/Eco \leq 0.95$. As a result, there is an advantage that the occurrence of separation of rubber materials between the pair of cross belts 142, 143 and in a region on the outer side in the tire width direction of the circumferential reinforcing layer 145 is suppressed.

Conversely, according to the configuration illustrated in FIG. 14, the belt edge cushion 19 in the configuration illustrated in FIG. 1 has a two-color structure composed of a stress relief rubber 191 and an edge portion relief rubber 192. The stress relief rubber 191 is disposed between the pair of cross belts 142, 143 on the outer side of the circumferential reinforcing layer 145 in the tire width direction so as to be adjacent to the circumferential reinforcing layer 145. The edge portion relief rubber 192 is disposed between the pair of cross belts 142, 143 on the outer side of the stress relief rubber 191 in the tire width direction at a position corresponding to the edge portion of the pair of cross belts 142, 143 so as to be adjacent to the stress relief rubber 191. Therefore, when viewed as a cross-section from the tire meridian direction, the belt edge cushion 19 has a structure composed by disposing the stress relief rubber 191 and the edge portion relief rubber 192 side to side in the tire width direction to fill a region from the end portion of the circumferential reinforcing layer 145 on the outer side in the tire width direction to the edge portion of the pair of cross belts 142, 143.

Additionally, a modulus Ein at 100% elongation of the stress relief rubber 191 and the modulus Es at 100% elongation of the coating rubber of the circumferential reinforcing layer 145 have a relationship satisfying Ein<Es in the configuration in FIG. 14. Specifically, the modulus Ein of the stress relief rubber 191 and the modulus Es of the circumferential reinforcing layer 145 preferably have a relationship satisfying 0.6≤Ein/Es≤0.9.

Moreover, in the configuration illustrated in FIG. 14, a modulus Ein at 100% elongation of the stress relief rubber 191 and the modulus Eco at 100% elongation of the coating rubber of the cross belts 142, 143 have a relationship satisfying Ein<Eco. Specifically, the modulus Ein of the stress relief rubber 191 and the modulus Eco of the coating rubber preferably have a relationship satisfying 0.6≤Ein/Eco≤0.9.

Additionally, a modulus Eout at 100% elongation of the end portion relief rubber 192 and the modulus Ein at 100% elongation of the stress relief rubber 191 preferably have a relationship satisfying Eout<Ein in the configuration in FIG. 14. Additionally, the modulus Ein at 100% elongation of the stress relief rubber 191 preferably is within a range satisfying 4.0 MPa≤Ein≤5.5 MPa.

Since the stress relief rubber 191 is disposed on the outer side of the circumferential reinforcing layer 145 in the tire width direction in the configuration illustrated in FIG. 14, shear strain on the surrounding rubber between the edge portion of the circumferential reinforcing layer 145 and the cross belts 142, 143 is alleviated. Moreover, since the end portion relief rubber 192 is disposed at a position corresponding to the edge portions of the cross belts 142, 143, shear strain on the surrounding rubber at the edge portions of the cross belts 142, 143 is alleviated. Accordingly, separation of the surrounding rubber of the circumferential reinforcing layer 145 is suppressed.

Effect

As described above, this pneumatic tire 1 includes a carcass layer 13, a belt layer 14 disposed on the outer side of the carcass layer 13 in the tire radial direction, and a tread rubber 15 disposed on the outer side of the belt layer 14 in the tire radial direction (see FIG. 1). In addition, the belt layer 14 is formed by laminating a pair of cross belts 142, 143 having a belt angle with an absolute value from 10° to 45° both inclusive and mutually opposite signs, and a circumferential reinforcing layer 145 having a belt angle within a range of ±5° relative to the tire circumferential direction (see FIG. 3). Moreover, the distance Gcc from the tread profile to the tire inner circumferential surface along the tire equatorial plane CL and the distance Gsh from the tread edge P to the tire inner circumferential surface have a relationship satisfying 1.10≤Gsh/Gcc (see FIG. 2). In addition, the groove depth (Dsh) and under-groove gauge (UDsh) of the outermost circumferential main groove 2 have a relationship satisfying 0.20≤UDsh/Dsh.

In such a configuration, (1) because the ratio Gsh/Gcc is set to a high value, the tread face as a whole has a flat (substantially parallel to the tire rotational axis) shape, and further, the volume of tread rubber 15 (distance Gsh) at the shoulder portion is assured (see FIG. 1 and FIG. 2). Thus, there is an advantage that the strain on each of the belt plies 141 to 145 is reduced when the tire makes contact with the ground (FIG. 4B), and belt separation resistance performance is improved.

In addition, (2) since the ratio Gsh/Gcc is set to a high value and the shoulder portion has a thick structure, the amount of buffing can be properly assured while preventing exposure of the belt layer during retreading of used tires. Thus, there is an advantage that the yield of the base tire is improved. In addition, this is particularly preferred since the shoulder portion has a thick structure, the shoulder wear portion of a used tire can be properly removed through buffing even when the shoulder wear portion is wide.

In addition, (3) since the under-groove gauge UDsh of the circumferential main grooves 2 is properly assured, a sufficient amount of buffing can be assured so that no shoulder wear of the used tire remains on the base tire. Thus, there is an advantage that the yield of the base tire is improved.

In addition, in this pneumatic tire 1, the groove depth Dcc and the under-groove gauge UDcc of the circumferential main groove 2 closest to the tire equatorial plane CL have a relationship satisfying 0.15≤UDcc/Dcc (see FIG. 2). In such a configuration, the under-groove gauge UDcc of the circumferential main groove 2 is properly assured, and a sufficient amount of buffing can be assured so that no shoulder wear of the used tire remains on the base tire. Thus, there is an advantage that the yield of the base tire is improved.

In addition, in this pneumatic tire 1, when a straight line L1 parallel to the tire rotational axis is drawn from the end portion of the plurality belt plies 141 to 145 constituting the belt layer 14 on the outer side in the tire width direction from the outermost circumferential main groove 2 and the outermost side in the tire radial direction when viewed as a cross-section from the tire meridian direction, the opening end portion 41 of the lug groove 4 is disposed on the outer side in the tire radial direction from the straight line L1 (see FIG. 6). In such a configuration, when the opening end portion 41 of the lug groove 4 is used as a mark to decide the tire rehabilitation period, exposure of the end portion of the belt ply to the base tire surface during buffing is prevented. Thus, there is an advantage that the yield of the base tire is improved.

In addition, in this pneumatic tire 1, when a curved line L2 parallel to the tire profile is drawn passing through the groove bottom of the outermost circumferential main groove 2 when viewed as a cross-section from the tire meridian direction, all of the belt plies 141 to 145 constituting the belt layer 14 are on the inner side in the tire radial direction from the curved line L2 (see FIG. 7). Thus, there is an advantage that exposure of the end portion of the belt plies to the base tire surface during buffing is prevented, and the yield of the base tire is improved.

In addition, in this pneumatic tire 1, when an intersection Q between the curved line L2 described above and buttress portion is taken, the under-groove gauge UDsh of the outermost circumferential main groove 2, and the distance ΔDrg in the tire radial direction from the intersection Q to the opening end portion 41 of the lug groove 4, taking the outer side in the tire radial direction as being positive, have a relationship satisfying −1.0≤ΔDrg/UDsh≤1.0 (see FIG. 7). In such a configuration, there is an advantage that, when the opening end portion 41 of the lug groove 4 is used as a mark to decide the tire rehabilitation period, the position of this opening end portion 41 is made appropriate. That is, by satisfying the relationship $\Delta Drg/UDsh \leq 1.0$, the rehabilitation period of the tire is delayed, and the primary life of the tire extended. By satisfying the relationship $-1.0 \leq \Delta Drg/UDsh$, whether or not a tire is retreadable can be precisely decided.

In addition, in this pneumatic tire 1, when a straight line L3 is drawn joining the groove bottom of the outermost circumferential main groove 2 and the opening end portion 41 of the lug groove 4 when viewed as a cross-section from the tire meridian direction, all of the belt plies 141 to 145 constituting the belt layer 14 are on the inner side in the tire radial direction from the straight line L3 (see FIG. 8). Thus, there is an advantage that exposure of the end portion of the belt plies to the base tire surface during buffing is prevented, and the yield of the base tire is improved.

In addition, in this pneumatic tire 1, when a straight line L4 is drawn joining the midpoint M of the under-groove gauge UDsh of the outermost circumferential main groove 2 and the opening end portion 41 of the lug groove 4 when viewed as a cross-section from the tire meridian direction, all of the belt plies 141 to 145 constituting the belt layer 14 are on the inner side in the tire radial direction from the straight line L4 (see FIG. 9). Thus, there is an advantage that exposure of the end portion of the belt plies to the base tire surface during buffing is prevented, and the yield of the base tire is improved.

In addition, in this pneumatic tire 1, the groove depth Dsh and under-groove gauge UDsh of the outermost circumferential main groove 2, and the distance Drg in the tire radial direction from the tire ground contact edge T to the opening end portion 41 of the lug groove 4, have a relationship satisfying $0.7 \leq Drg/(Dsh+UDsh) \leq 1.1$. In such a configuration, there is an advantage that, when the opening end portion 41 of the lug groove 4 is used as a mark to decide the tire rehabilitation period, the position of this opening end portion 41 is made appropriate. Thus, there is an advantage that whether or not a tire is retreadable can be precisely decided.

Additionally, in the pneumatic tire 1, the tread width TW and the width Ws of the circumferential reinforcing layer 145 have a relationship satisfying $0.70 \leq Ws/TW \leq 0.90$ (see FIG. 1). In such a configuration, due to the fact that the ratio Ws/TW between the tread width TW and the width Ws of the circumferential reinforcing layer 145 is optimized, there is the advantage that the amount of deformation of the shoulder land portion 3 when the tire makes ground contact is effectively reduced (see FIG. 4B and FIG. 5). That is, by satisfying the relationship $0.70 \leq Ws/TW$, the width Ws of the circumferential reinforcing layer 145 is appropriately assured and the amount of deformation of the shoulder land portion 3 when the tire makes ground contact is reduced. In addition, by satisfying the relationship $Ws/TS \leq 0.90$, the deformation of each belt ply end portion is suppressed when the tire makes ground contact, and thus the strain on each belt ply end portion is reduced.

In addition, particularly, in a configuration having a wide circumferential reinforcing layer 145 satisfying the relationship of $0.70 \leq Ws/TW$, the rigidity difference between a center region having a circumferential reinforcing layer 145 and a shoulder region outward thereof is large, so shoulder wear tends to occur. Consequently, there is an advantage that, in such a configuration, since the opening end portion 41 of the lug groove 4 is used as a mark to decide the tire rehabilitation period, and the position of the opening end portion 41 is made appropriate, significant improvement in yield of the base tire is achieved.

Also, in the pneumatic tire 1, the belt cords that constitute the circumferential reinforcing layer 145 are steel wire, and the circumferential reinforcing layer 145 has the number of ends from 17 ends/50 mm to 30 ends/50 mm both inclusive. As a result, there is the advantage that the number of ends of the belt cords of the circumferential reinforcing layer 145 is made appropriate. Specifically, the strength of the circumferential reinforcing layer 145 is properly assured due to the circumferential reinforcing layer 145 having at least 17 ends/50 mm. Moreover, the amount of rubber of the coating rubber of the circumferential reinforcing layer 145 is properly assured and separation of the rubber materials between the contiguous belt plies (the pair of cross belts 142, 143 and the circumferential reinforcing layer 145 in FIG. 3) is suppressed due to the circumferential reinforcing layer 145 having not greater than 30 ends/50 mm.

In the pneumatic tire 1, the elongation of the belt cords from which the circumferential reinforcing layer 145 is configured when they are components when subjected to a tensile load of 100 N to 300 N is preferably from 1.0% to 2.5% both inclusive. As a result, there is an advantage that the effect of suppressing radial growth in the center region is properly assured due to the circumferential reinforcing layer 145.

In the pneumatic tire 1, elongation is from 0.5% to 2.0% both inclusive when the tensile load of the belt cords as tire components that constitute the circumferential reinforcing layer 145 is from 500 N to 1000 N. As a result, there is an advantage that the effect of suppressing radial growth in the center region is properly assured due to the circumferential reinforcing layer 145.

In the pneumatic tire 1, the circumferential reinforcing layer 145 is disposed on the inner side in the tire width direction from the left and right edge portions of the narrower cross belt 143 of the pair of cross belts 142, 143 (see FIG. 3). In addition, the pneumatic tire 1 has stress relief rubber 191 disposed between the pair of cross belts 142, 143 on the outer side in the tire width direction of the circumferential reinforcing layer 145 and adjacent to the circumferential reinforcing layer 145, and end portion relief rubber 192 disposed between the pair of cross belts 142, 143 on the outer side in the tire width direction of the stress relief rubber 191 and at a position corresponding to the edge portion of the pair of cross belts 142, 143 and adjacent to the stress relief rubber 191 (see FIG. 14).

In such a configuration, there is an advantage that fatigue rupture of the surrounding rubber at the edge portion of the circumferential reinforcing layer 145 is suppressed due to the circumferential reinforcing layer 145 being disposed on the inner side in the tire width direction from the left and right edge portions of the narrower cross belt 143 of the pair of cross belts 142, 143. Since the stress relief rubber 191 is disposed on the outer side of the circumferential reinforcing layer 145 in the tire width direction, shear strain on the surrounding rubber between the edge portion of the circumferential reinforcing layer 145 and the cross belts 142, 143 is alleviated. Moreover, since the end portion relief rubber 192 is disposed at a position corresponding to the edge portions of the cross belts 142, 143, shear strain on the surrounding rubber at the edge portions of the cross belts 142, 143 is alleviated. Accordingly, there is an advantage that separation of the surrounding rubber of the circumferential reinforcing layer 145 is suppressed.

Furthermore, in the pneumatic tire 1, the modulus Ein at 100% elongation of the stress relief rubber 191 and the modulus Eco at 100% elongation of the coating rubber of the pair of cross belts 142, 143 have a relationship satisfying Ein<Eco. As a result, there is an advantage that the modulus Ein of the stress relief rubber 191 is made appropriate and the shear strain on the surrounding rubber between the edge portion of the circumferential reinforcing layer 145 and the cross belts 142, 143 is alleviated.

Furthermore, in the pneumatic tire 1, the modulus Ein at 100% elongation of the stress relief rubber 191 and the modulus Eco at 100% elongation of the coating rubber of the pair of cross belts 142, 143 have a relationship satisfying 0.6≤Ein/Eco≤0.9. As a result, there is the advantage that the ratio Ein/Eco is made appropriate and the shear strain on the surrounding rubber between the edge portion of the circumferential reinforcing layer 145 and the cross belts 142, 143 is alleviated.

Additionally, in the pneumatic tire 1, the modulus Ein at 100% elongation of the stress relief rubber 191 is within a range satisfying 4.0 MPa≤Ein≤5.5 MPa (see FIG. 14). As a result, there is an advantage that the modulus Ein of the stress relief rubber 191 is made appropriate and the shear strain on the surrounding rubber between the edge portion of the circumferential reinforcing layer 145 and the cross belts 142, 143 is alleviated.

In addition, in the pneumatic tire 1, the belt layer 14 has a large angle belt 141 having a belt angle with an absolute value from 45° to 70° both inclusive (see FIG. 1 and FIG. 3). As a result, there is the advantage that the belt layer 14 is reinforced and strain on the end portions of the belt layer 14 when the tire makes ground contact is suppressed.

Furthermore, in the pneumatic tire 1, the width Wb1 of the large angle belt 141 and the width Wb3 of the narrower cross belt 143 of the pair of cross belts 142, 143 have a relationship satisfying 0.85≤Wb1/Wb3≤1.05 (see FIG. 3). With such a configuration, the ratio Wb1/Wb3 between the width Wb1 of the large angle belt 141 and the width Wb3 of the narrower cross belt 143 is made appropriate. As a result, there is the advantage that the strain on the end portions of the belt layer 14 when the tire makes ground contact is suppressed.

In the pneumatic tire 1, the circumferential reinforcing layer 145 is disposed on the inner side in the tire width direction from the left and right edge portions of the narrower cross belt 143 of the pair of cross belts 142, 143 (see FIG. 3). Also, the width Wb3 of the narrower cross belt 143 and the distance S from the edge portion of the circumferential reinforcing layer 145 to the edge portion of the narrower cross belt 143 have a relationship satisfying 0.03≤S/Wb3≤0.12. Thus, there is an advantage that a positional relationship S/Wb3 between the edge portions of the cross belts 142, 143 and the edge portions of the circumferential reinforcing layer 145 are made appropriate. Specifically, by satisfying the relationship 0.03≤S/Wb3, a distance between the end portions of the circumferential reinforcing layer 145 and the end portions of the cross belt 143 is properly assured, and the separation of the surrounding rubber at the end portions of these belt plies 145, 143 is suppressed. Additionally, by satisfying the relationship S/Wb3≤0.12, the width Ws of the circumferential reinforcing layer 145 relative to the width Wb3 of the cross belt 143 is assured, and a hoop effect from the circumferential reinforcing layer 145 is properly assured.

Target of Application

Furthermore, the pneumatic tire 1 is preferably applied to a heavy duty tire with an aspect ratio of not greater than 70% when mounted on a regular rim and in a state of being inflated to a regular internal pressure and having a regular load.

EXAMPLES

FIGS. 15 and 16 are tables showing the results of performance testing of pneumatic tires according to the embodiment of the present technology.

In this performance testing, (1) belt edge separation resistance performance and (2) the yield of the base tire were evaluated for a plurality of mutually different pneumatic tires (see FIG. 15 and FIG. 16). In this evaluation, pneumatic tires having a tire size of 315/60 R22.5 were attached to a rim with a rim size of 22.5×9.00 and inflated to an air pressure of 900 kPa.

(1) In evaluating the belt edge separation resistance performance, low-pressure resistance testing was performed using an indoor drum tester. Then, running speed was set to 45 km/hr, the load was increased from 34.81 kN every 12 hours by 5% (1.74 kN), and the running distance was measured when the tire had failed. Then, an index evaluation was performed based on these measurement results using a conventional example as the standard (100). In these evaluations, higher scores were preferred. Specifically, an evaluation of 110 or greater indicates dramatic superiority over the conventional example.

(2) In evaluating the yield of the base tire, a 4×2 tractor trailer test vehicle was run with pneumatic tires mounted, and every 100 tires with wear up to the opening portions of the lug grooves of the shoulder land portions were sampled for each specification. Then, these tires were buffed, examined for any remaining belt ply exposure on the base tire surface and groove bottom line of the circumferential main grooves, and then evaluated for retreadability. In these evaluations, higher scores were preferred. Specifically, an evaluation of 90% or greater indicated dramatic superiority over the Conventional Example.

The pneumatic tires of Working Examples 1 to 18 had the configuration illustrated in FIGS. 1 to 3. In addition, principal dimensions were set at TW=275 mm, Gcc=32.8 mm, Dcc=13.0 mm, and Dsh=13.5 mm. In addition, as illustrated in FIG. 7, each of the belt plies 141 to 145 of the belt layer 14 was on the inner side in the tire width direction from the virtual line L2 drawn from the groove bottom of the outermost circumferential main groove 2.

In the configuration of FIGS. 1 to 3, the pneumatic tire of the Conventional Example does not have a circumferential reinforcing layer.

As shown by the test results, in the pneumatic tires 1 of Working Examples 1 to 18, the belt edge separation resistance performance of the tires and the yield of the base tires were improved. In particular, when comparing Working Examples 1 to 11, as a result of each of the belt plies 141 to 145 being on the inner side in the tire radial direction from the virtual line L2 in FIG. 7, and satisfying the requirements of 0.20≤UDsh/Dsh, 0.20≤UDcc/Dcc, and 0.7≤Drg/(Dsh+UDsh)≤1.1, dramatically superior effects (evaluation of 95% or greater) were achieved for the yield of the base tire. Furthermore, when comparing Working Examples 1 to 3 and Working Examples 12 to 18, as a result of satisfying the requirements of 1.20≤Gsh/Gcc and 0.70≤Ws/TW≤0.90, dramatically superior effects (evaluation of 110 or greater) were also achieved for the belt edge separation resistance performance.

The invention claimed is:
1. A pneumatic tire, comprising:
a carcass layer;
a belt layer disposed on an outer side in a tire radial direction of the carcass layer;

a tread rubber disposed on an outer side in a tire radial direction of the belt layer;

at least three circumferential main grooves extending in a tire circumferential direction; and a plurality of land portions defined by the circumferential main grooves;

left and right circumferential main grooves on an outermost side in a tire width direction are outermost circumferential main grooves, and left and right land portions on an outer side in a tire width direction that are defined by the outermost circumferential main grooves are shoulder land portions, the belt layer being formed by laminating a pair of cross belts having a belt angle with an absolute value from 10° to 45° both inclusive and mutually opposite signs, and a circumferential reinforcing layer having a belt angle within a range of ±5° relative to the tire circumferential direction;

a distance Gcc from a tread profile to a tire inner circumferential surface along a tire equatorial plane and a distance Gsh from a tread edge to a tire inner circumferential surface having a relationship satisfying 1.10≤Gsh/Gcc; and a groove depth Dsh of the outermost circumferential main grooves and an under-groove gauge UDsh having a relationship satisfying 0.20≤UDsh/Dsh; wherein a groove depth Dcc and an under-groove gauge UDcc of the circumferential main groove nearest the tire equatorial plane have a relationship satisfying 0.15≤UDcc/Dcc;

a ratio UDsh/Dsh and a ratio UDcc/Dcc have a relationship satisfying UDcc/Dcc<UDsh/Dsh;

the groove depths Dsh and Dcc have a relationship satisfying 1.0≤Dsh/Dcc≤1.2;

the shoulder land portions have a lug groove opening to a buttress portion;

where a straight line L1 parallel to a tire rotational axis is drawn from an end portion of a plurality of belt plies constituting the belt layer that is on the outer side in the tire width direction from the outermost circumferential main grooves and the outermost side in the tire radial direction when viewed as a cross-section from a tire meridian direction, an opening end portion of the lug groove is on the outer side in the tire radial direction from the straight line L1;

where a curved line L2 parallel to a tire profile is drawn passing through a groove bottom of the outermost circumferential main grooves when viewed as a cross-section from a tire meridian direction, all belt plies constituting the belt layer are on an inner side in the tire radial direction from the curved line L2;

where an intersection Q between the curved line L2 and the buttress portion is taken, the under-groove gauge UDsh of the outermost circumferential main grooves, and a distance ΔDrg in the tire radial direction from the intersection Q to an opening end portion of the lug groove, taking the outer side in the tire radial direction as being positive, have a relationship satisfying −1.0≤ΔDrg/UDsh<0;

where a straight line L3 is drawn joining a groove bottom of one of the outermost circumferential main grooves and an opening end portion of the lug groove when viewed as a cross-section from a tire meridian direction, all belt plies constituting the belt layer are on an inner side in the tire radial direction from the straight line L3; and the groove depth Dsh and the under-groove gauge UDsh of the outermost circumferential main grooves, and a distance Drg in the tire radial direction from a tire ground contact edge to an opening end portion of the lug groove have a relationship satisfying 0.7≤Drg/(Dsh+UDsh)≤1.1.

2. The pneumatic tire according to claim 1, where a straight line L4 is drawn joining a midpoint of the under-groove gauge UDsh of the outermost circumferential main grooves and an opening end portion of the lug groove when viewed as a cross-section from a tire meridian direction, all belt plies constituting the belt layer are on an inner side in the tire radial direction from the straight line L4.

3. The pneumatic tire according to claim 1, wherein a tread width TW and a width Ws of the circumferential reinforcing layer have a relationship satisfying 0.70≤Ws/TW≤0.90.

4. The pneumatic tire according to claim 1, wherein belt cords of the circumferential reinforcing layer are steel wire and have a number of ends from 17 ends/50 mm to 30 ends/50 mm both inclusive.

5. The pneumatic tire according to claim 1, wherein elongation is from 1.0% to 2.5% both inclusive upon a tensile load of belt cords as components that configure the circumferential reinforcing layer being from 100 N to 300 N.

6. The pneumatic tire according to claim 1, wherein elongation is from 0.5% to 2.0% both inclusive upon a tensile load of belt cords as cured tire components that constitute the circumferential reinforcing layer being from 500 N to 1000 N.

7. The pneumatic tire according to claim 1, wherein the circumferential reinforcing layer is disposed on an inner side in the tire width direction from left and right edge portions of a narrower cross belt of the pair of cross belts, the pneumatic tire further comprising:

a stress relief rubber disposed between the pair of cross belts and disposed on the outer side in the tire width direction of the circumferential reinforcing layer and adjacent to the circumferential reinforcing layer; and an edge portion relief rubber disposed between the pair of cross belts and disposed on the outer side in the width direction of the stress relief rubber and at a position corresponding to an edge portion of the pair of cross belts so as to be adjacent to the stress relief rubber.

8. The pneumatic tire according to claim 7, wherein a modulus Ein at 100% elongation of the stress relief rubber and a modulus Eco at 100% elongation of coating rubber of the pair of cross belts have a relationship satisfying Ein<Eco.

9. The pneumatic tire according to claim 8, wherein the modulus Ein at 100% elongation of the stress relief rubber and the modulus Eco at 100% elongation of coating rubber of the pair of cross belts have a relationship satisfying 0.6≤Ein/Eco≤0.9.

10. The pneumatic tire according to claim 9, wherein the modulus Ein at 100% elongation of the stress relief rubber is within a range satisfying 4.0 MPa≤Ein≤5.5 MPa.

11. The pneumatic tire according to claim 1, wherein the belt layer has a large angle belt having a belt angle with an absolute value from 45° to 70° both inclusive.

12. The pneumatic tire according to claim 11, wherein a width Wb1 of the large angle belt and a width Wb3 of a narrower cross belt of the pair of cross belts have a relationship satisfying 0.85≤Wb1/Wb3≤1.05.

13. The pneumatic tire according to claim 1, wherein the circumferential reinforcing layer is disposed on an inner side in the tire width direction from left and right edge portions of a narrower cross belt of the pair of cross belts, and
a width Wb3 of the narrower cross belt and a distance S from an edge portion of the circumferential reinforcing layer to an edge portion of the narrower cross belt are within a range satisfying $0.03 \leq S/Wb3 \leq 0.12$.

14. The pneumatic tire according to claim 1 applied to a heavy duty tire with an aspect ratio of 70% or less.

* * * * *